United States Patent
Nelson et al.

(10) Patent No.: US 11,252,460 B2
(45) Date of Patent: Feb. 15, 2022

(54) SIGNATURE MATCHING WITH METER DATA AGGREGATION FOR MEDIA IDENTIFICATION

(71) Applicant: The Nielsen Company (US), LLC, New York, NY (US)

(72) Inventors: Daniel Nelson, Tampa, FL (US); Raghuram Ranganathan, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/832,681

(22) Filed: Mar. 27, 2020

(65) Prior Publication Data
US 2021/0306687 A1 Sep. 30, 2021

(51) Int. Cl.
*H04N 21/24* (2011.01)
*H04N 21/234* (2011.01)
*H04N 21/235* (2011.01)
*H04N 21/835* (2011.01)

(52) U.S. Cl.
CPC ..... *H04N 21/2407* (2013.01); *H04N 21/2353* (2013.01); *H04N 21/23418* (2013.01); *H04N 21/835* (2013.01)

(58) Field of Classification Search
None
See application file for complete search history.

(56) References Cited

U.S. PATENT DOCUMENTS

| | | | |
|---|---|---|---|
| 4,677,466 A | 6/1987 | Lert, Jr. et al. |
| 5,481,294 A | 1/1996 | Thomas et al. |
| 7,460,684 B2 | 12/2008 | Srinivasan |
| 7,681,032 B2 | 3/2010 | Peled et al. |

(Continued)

FOREIGN PATENT DOCUMENTS

WO 2016053368 4/2016

OTHER PUBLICATIONS

Patent Cooperation Treaty, "International Search Report," mailed in connection with International Patent Application No. PCT/US2021/024435, dated Jul. 6, 2021, 3 pages.
(Continued)

*Primary Examiner* — Fernando Alcon
(74) *Attorney, Agent, or Firm* — Hanley, Flight & Zimmerman, LLC

(57) ABSTRACT

Example apparatus disclosed herein to implement signature matching with meter data aggregation for use in media identification applications include a match job aggregator to aggregate batches of meter data from a meter to form aggregated meter data associated with the meter, and a hash matcher to identify a valid hash key match between meter hash keys generated from meter signatures in the aggregated meter data and reference hash keys corresponding to a collection of media assets. Disclosed example apparatus also include a signature matcher to align, based on the valid hash key match, a sequence of reference signatures corresponding to a first media asset associated with the valid hash key match and a corresponding sequence of the meter signatures, and compare the sequence of reference signatures and the corresponding sequence of meter signatures to identify media represented by at least a portion of the sequence of the meter signatures.

20 Claims, 9 Drawing Sheets

(56) References Cited

U.S. PATENT DOCUMENTS

| | | | |
|---|---|---|---|
| 9,313,359 B1 | 4/2016 | Stojancic et al. | |
| 9,438,940 B2 | 9/2016 | Nelson | |
| 9,548,830 B2 | 1/2017 | Kariyappa et al. | |
| 9,668,020 B2 | 5/2017 | Nelson et al. | |
| 10,200,546 B2 | 2/2019 | Nelson et al. | |
| 10,440,413 B2 | 10/2019 | Nelson et al. | |
| 2005/0232411 A1 | 10/2005 | Srinivasan et al. | |
| 2006/0153296 A1 | 7/2006 | Deng | |
| 2006/0184961 A1 | 8/2006 | Lee et al. | |
| 2006/0195861 A1 | 8/2006 | Lee | |
| 2007/0274537 A1 | 11/2007 | Srinivasan | |
| 2007/0300249 A1* | 12/2007 | Smith | H04N 21/434 725/19 |
| 2008/0091288 A1 | 4/2008 | Srinivasan | |
| 2008/0276265 A1 | 11/2008 | Topchy et al. | |
| 2010/0115542 A1* | 5/2010 | Lee | G06K 9/00543 725/19 |
| 2012/0215789 A1 | 8/2012 | Ramanathan et al. | |
| 2012/0259587 A1 | 10/2012 | Sannino et al. | |
| 2012/0297198 A1* | 11/2012 | Danezis | H04L 9/3218 713/179 |
| 2013/0160042 A1* | 6/2013 | Stokes | H04H 60/32 725/18 |
| 2014/0250091 A1 | 9/2014 | Wu | |
| 2015/0288513 A1* | 10/2015 | Nelson | H04N 21/2353 380/44 |
| 2015/0289013 A1* | 10/2015 | Nelson | H04N 21/44204 725/19 |
| 2016/0034452 A1 | 2/2016 | Ramanathan et al. | |
| 2017/0134395 A1* | 5/2017 | Enns | H04L 9/3242 |
| 2019/0037257 A1* | 1/2019 | Nelson | G06F 16/483 |
| 2020/0092592 A1 | 3/2020 | Silverman et al. | |

OTHER PUBLICATIONS

Patent Cooperation Treaty, "Written Opinion," mailed in connection with International Patent Application No. PCT/US2021/024435, dated Jul. 6, 2021, 3 pages.

\* cited by examiner

SIGNATURE MATCHING WITH METER DATA AGGREGATION FOR MEDIA IDENTIFICATION

FIELD OF THE DISCLOSURE

This disclosure relates generally to media monitoring and, more particularly, to signature matching with meter data aggregation for media identification.

BACKGROUND

A media monitoring system typically includes one or more device meters to monitor the media presented by one or more media devices located at one or more monitored sites. In some example media monitoring systems, media signatures are collected by the device meters and used to identify and/or otherwise monitor the media presented by the one or more monitored media devices. Unlike media monitoring techniques based on codes and/or watermarks included with and/or embedded in the monitored media, signature-based media monitoring techniques generally use one or more inherent characteristics of the monitored media measured over a monitoring time interval to generate a substantially unique proxy to represent the media. Such a proxy is referred to as a media signature or media fingerprint, and can take any form (e.g., a series of digital values, a waveform, etc.) representative of any aspect(s) of the monitored media signal(s) (e.g., the audio and/or video signals forming the media presentation being monitored). A good media signature generation algorithm is typically one that generates repeatable signatures from the same media presentation, but generates unique signatures relative to other (e.g., different) presentations of other (e.g., different) media.

When signatures are used for media monitoring, signatures of the monitored media (referred to herein as meter signatures) are generated by the device meter and compared to reference signatures representative of reference media known to the media monitoring system. When a match is found, the media corresponding to the meter signatures being processed can be identified as corresponding to the reference media represented by the matching reference signatures. In many media monitoring systems, the device meters provide their generated site signatures to a data processing facility or other centralized processing site for comparison with the reference signatures that are representative of the reference media available for presentation at the respective monitored sites.

Figure 1:
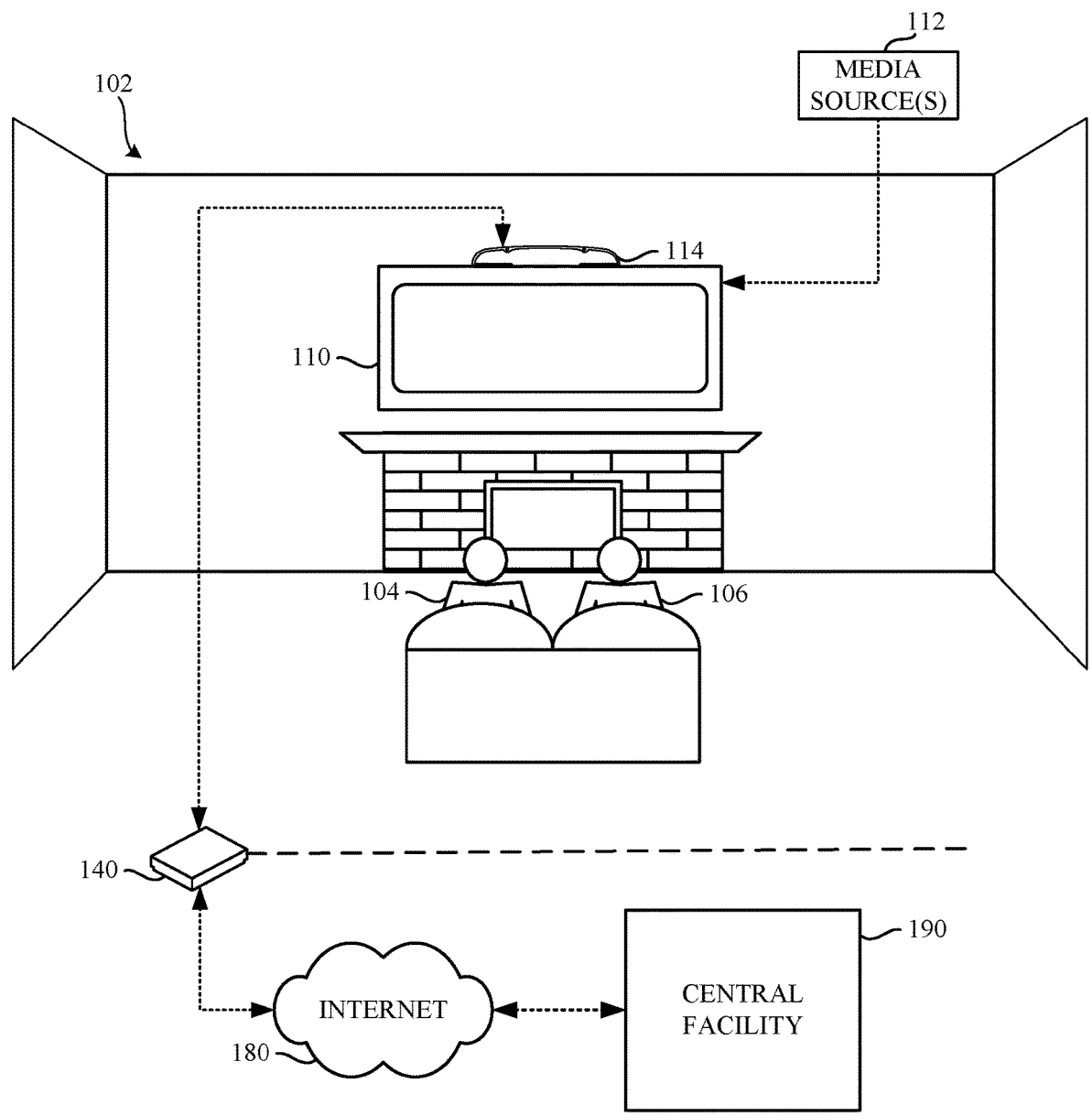
FIG. 1 is a block diagram of an example environment of use including an example media monitoring system structured to implement signature matching with meter data aggregation for media identification in accordance with teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to implement signature matching with meter data aggregation for use in media identification applications are disclosed herein. Example media identification apparatus disclosed herein include an example match job aggregator to aggregate batches of meter data from a meter to form aggregated meter data associated with the meter. In some examples, the batches of meter data correspond to respective reporting intervals having a first duration, and the aggregated meter data corresponds to a monitoring interval having a second duration larger than the first duration. For example, the second duration may correspond to a twenty-four period, and the first duration may correspond to a fraction of the twenty-four period. Disclosed example media identification apparatus also include an example hash matcher to identify a valid hash key match between meter hash keys generated from meter signatures in the aggregated meter data and reference hash keys corresponding to a collection of media assets. Disclosed example media identification apparatus further include an example signature matcher to align, based on the valid hash key match, a sequence of reference signatures corresponding to a duration of a first media asset associated with the valid hash key match with a corresponding sequence of the meter signatures in the aggregated meter data. For example, the sequence of reference signatures may correspond to an entirety of the first media asset. In disclosed examples, the signature matcher is also to compare the sequence of reference signatures and the corresponding sequence of meter signatures to identify media represented by at least a portion of the sequence of the meter signatures.

In some disclosed examples, the signature matcher is to output an identifier of the media represented by the at least the portion of the sequence of the meter signatures, and a third duration corresponding to a duration represented by the at least the portion of the sequence of the meter signatures. In some examples, the signature matcher is to output the identifier and the third duration to an application that is to perform an operation based on the identifier and the third duration.

Additionally or alternatively, some disclosed example media identification apparatus include an example hash key generator to generate the meter hash keys from the meter signatures in the aggregated meter data.

Additionally or alternatively, in some disclosed examples, the hash matcher is to identify, for a first one of the meter hash keys, a set of reference hash keys that match the first one of the meter hash keys. In some such examples, the hash matcher is also to store ones of the set of reference hash keys in respective data structures corresponding to media assets represented by the ones of the set of reference hash keys. For example, the media assets may include the first media asset, and a first one of the data structures may corresponding to the first media asset. In some such examples, the first one of the data structures may include a sequence of reference hash keys that match a corresponding sequence of the meter hash keys. In some such examples, the hash matcher is further to determine that the first one of the sequence of reference hash keys included in the first one of the data structures corresponds to the valid hash key match when the sequence of reference hash keys and the corresponding sequence of the meter hash keys satisfy one or more validation criteria.

Furthermore, in some such examples, the signature generator is to align the sequence of reference signatures with the corresponding sequence of the meter signatures by identifying a first number of signatures from (i) an initial reference signature of the sequence of reference signatures corresponding to the duration of the first media asset to (ii) a reference signature in the sequence of reference signatures corresponding that corresponds to an initial reference hash key in the sequence of reference hash keys corresponding to the valid hash key match. The signature generator then identifies an initial meter signature of the sequence of meter signatures to be a first meter signature in the aggregated meter data that precedes, by the first number of signatures, a second meter signature in the aggregated meter data that corresponds to an initial meter hash key in the sequence of the meter hash keys corresponding to the valid hash key match. The signature generator further determines the sequence of meter hash keys to begin with the initial meter signature and include a same second number of signatures as the sequence of reference signatures.

These and other example methods, apparatus, systems and articles of manufacture (e.g., physical storage media) to implement signature matching with meter data aggregation for use in media identification applications are disclosed in further detail below.

Media monitoring system typically employ watermark identification techniques, signature identification techniques, or a combination of watermark and signature identifications to identify media presented on a monitored media device. Media watermarking is a technique used to identify media, such as television broadcasts, radio broadcasts, advertisements (television and/or radio), downloaded media, streaming media, prepackaged media, etc. Existing media watermarking techniques identify media by embedding one or more codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are detected/decoded and used to obtain data that can be mapped to media identifying information.

Unlike media monitoring techniques based on codes and/or watermarks embedded or otherwise included in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series/sequence of signatures collected in series over a timer interval. Generally, a good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the meter signature(s) to one or more references signatures corresponding to known (e.g., reference) media sources. Various comparison criteria, such as a cross-correlation value, a Hamming distance, etc., can be evaluated to determine whether a meter signature matches a particular reference signature. When a match between the meter signature and one of the reference signatures is found, the monitored media can be identified as corresponding to the particular reference media represented by the reference signature that with matched the meter signature. Because attributes, such as an identifier of the media, a presentation time, a broadcast channel, etc., are collected for the reference signature, these attributes may then be associated with the monitored media whose meter signature matched the reference signature. Example systems for identifying media based on codes and/or signatures are long known and were first disclosed in Thomas, U.S. Pat. No. 5,481,294, which is hereby incorporated by reference in its entirety.

Brute force signature matching involves comparing a sequence of meter signatures representative of the monitored media signal output from the monitored media device to sequences of references signatures representative of the different reference media assets available in a library of reference data, such as a reference asset database. As used herein, a media asset refers to data corresponding to any piece of media of interest, such as multimedia data conveying a movie, a television program episode, a radio program, a commercial, a video clip, etc. Thus, a reference asset database may contain respective sequences of reference signatures representative of the different multimedia data corresponding to a library of known movies, television program episodes, radio programs, commercials, video clips, etc. For example, a library of reference streaming video on demand (SVOD) media assets may contain sequences of reference signatures representative of 100,000 hours or more of SVOD content. In such a scenario, brute force signature matching between a sequence of meter signatures and sequences of reference signatures representative of 100,000 hours of reference media assets may be impractical, if not impossible even with today's high performance, cloud-based computing architectures.

Given the computationally intensive nature of brute force signature matching, media monitoring systems that employ signature matching may utilize hash key matching to identify seed points in the sequence of meter signatures at which brute force signature matching can be employed against the reference signatures of a single reference asset, rather than against the entire reference library. Hash key matching involves initially generating reference hash keys from the reference signatures in the sequences of reference signatures representative of the reference media assets, and storing the reference hash keys in a reference hash table. In some examples, each reference hash key is linked or otherwise associated with a media identifier of the reference media asset represented by that reference hash key, and a reference timestamp representing the time in the reference asset corresponding to the reference signature(s) used to generate that reference hash key In hash key matching, meter hash keys are then generated from the meter signatures in the sequence of meter media signatures. The meter hash keys are used to lookup or otherwise identify the matching reference hash keys in the reference hash table, from which the reference asset identifier and reference timestamps are obtained. As discussed in further detail below, if a sequence of meter hash keys and a corresponding matches sequence of reference hash keys for a given reference media asset satisfy one or more validation criteria, the resulting valid hash key match for that given reference media asset is used as a seed point for brute force matching between a sequence of reference signatures corresponding to that given reference media asset and the sequence of monitored media signatures.

In prior media monitoring systems employing hash key matching, the hash key matching and subsequent brute-force signature matching operations may be limited to batches of meter data corresponding to respective reporting intervals having a relatively short duration, such as on the order of minutes, such as 5 minutes or some other duration. Because hash key matching is susceptible to noise, it may be difficult for hash key match results to satisfy the validation criteria mentioned above. For example, monitored audio captured with a microphone may include background noise that will result in meter signatures for the monitored media that differ from reference signatures generated from the same media. Because a minor difference in a signature can result in a different hash key being generated for that signature, the presence of noise in monitored media signatures can reduce the likelihood of hash keys generated from those signatures being able to match the corresponding reference hash keys generated for the same media asset.

In contrast with such prior systems, example media monitoring systems disclosed herein employ signature matching with meter data aggregation, which combines meter data from multiple reporting intervals to form aggregated meter data covering a monitoring interval having a longer duration. For example, if the reporting intervals having a relatively short duration, such as on the order of minutes (e.g., 5 minutes), the aggregated meter data may cover a monitoring interval having a longer duration, such as on the order of hours (e.g., 24 hours). Disclosed example media monitoring systems that employ signature matching with meter data aggregation perform hash key matching over the aggregated monitoring interval, thereby increasing the opportunities for valid hash key matches. In some disclosed example media monitoring systems, once a valid hash key match is found, the system performs brute force signature matching over an entire duration of the reference media asset corresponding to the valid hash key match, rather than limiting matching to just the duration of the reporting interval as in some prior systems. As disclosed in further detail below, performing hash key matching over the aggregated monitoring interval associated with the aggregated meter data, rather than over just a shorter reporting interval, can improve the likelihood of identifying hash key matches that satisfy the validation criteria in the presence of noise (e.g., resulting from the monitored audio being captured with a microphone). Furthermore, performing brute force matching over the entire duration of the reference media asset corresponding to the valid hash key match, rather than just the duration of the reporting interval, can improve the ability for disclosed example monitoring systems to fully credit exposure to the monitored media.

Figure 2:
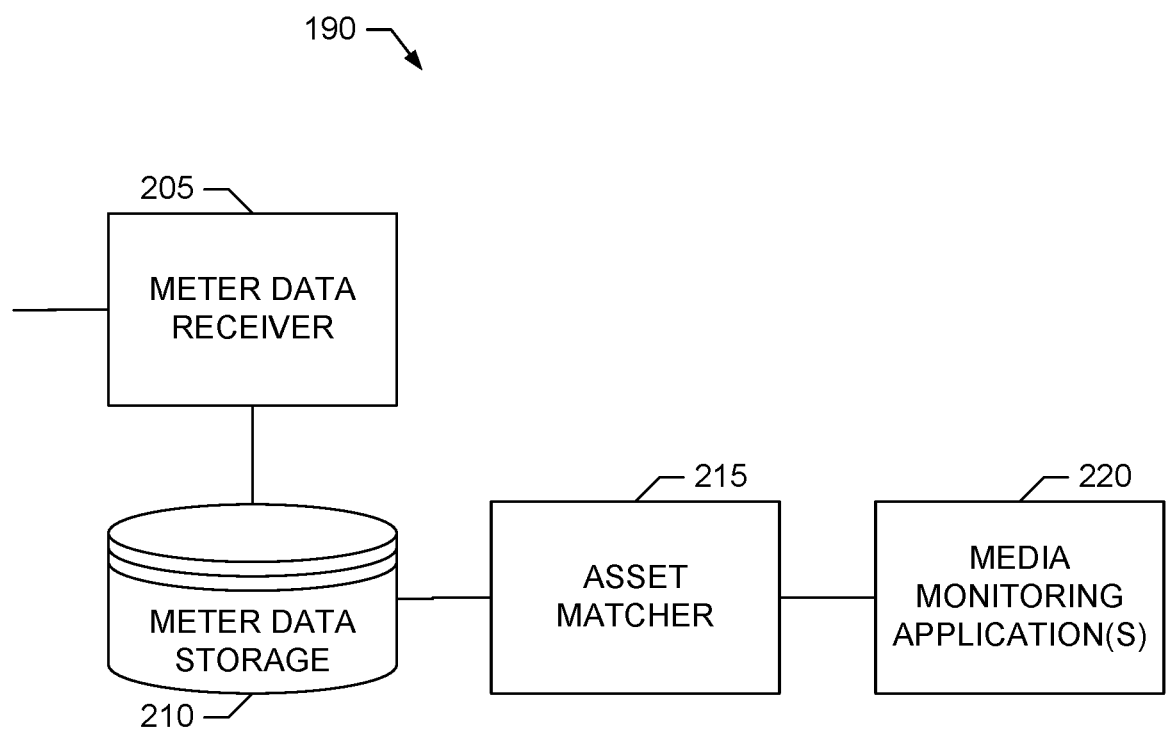
FIG. 2 is a block diagram of an example central facility included in the example media monitoring system of FIG. 1.
Figure 3:
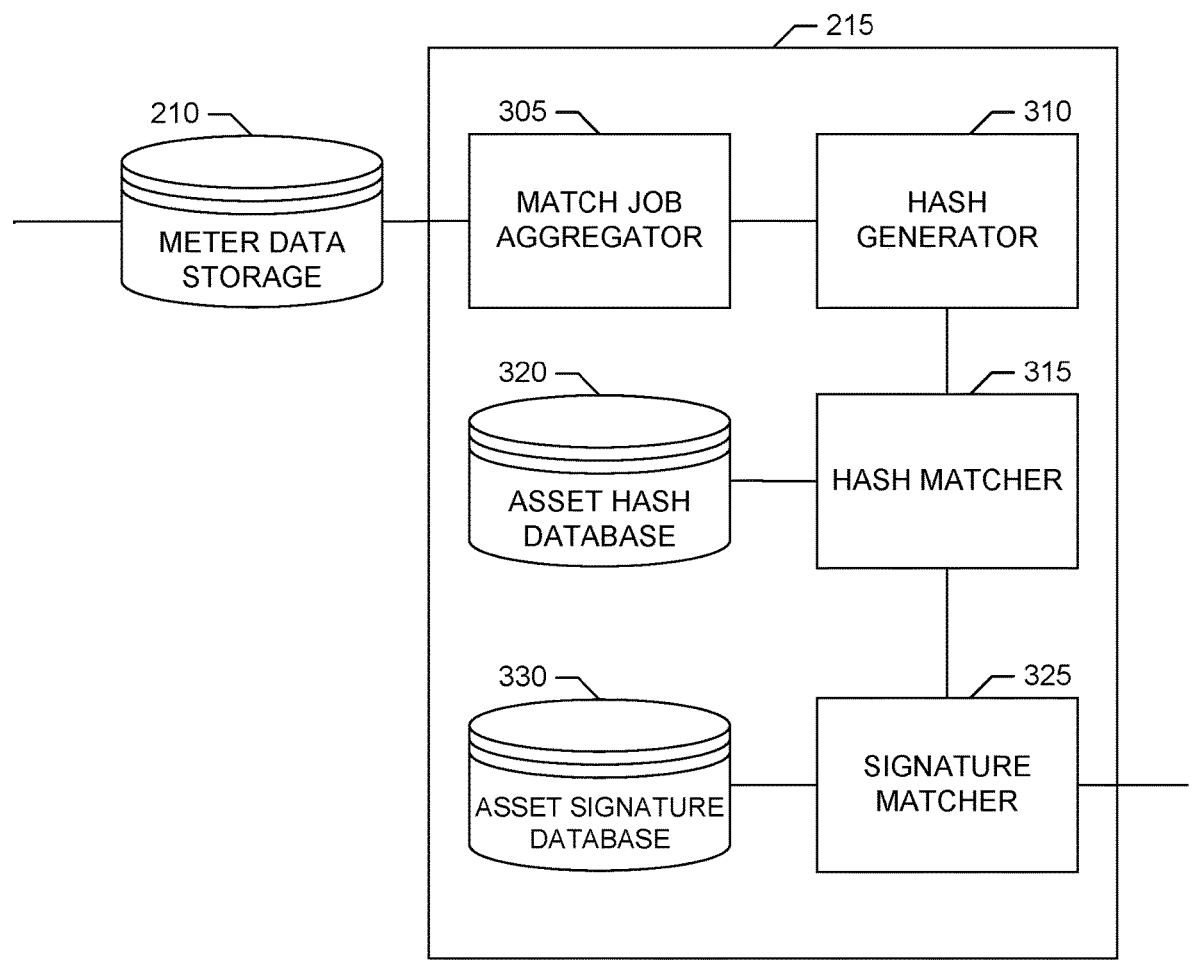
FIG. 3 is a block diagram of an example asset matcher included in the example central facility of FIG. 2 and structured to implement signature matching with meter data aggregation for media identification in accordance with teachings of this disclosure.

Turning to the figures, a block diagram of an example environment of use including an example media monitoring system structured to implement signature matching with meter data aggregation for media identification in accordance with teachings of this disclosure is illustrated in FIG. 1. In the illustrated example of FIG. 1, an example media presentation environment 102 includes example panelists 104, 106, an example media presentation device 110 that receives media from an example media source 112, and an example meter 114. The example meter 114 identifies the media presented by the example media presentation device 110 and reports media monitoring information to an example central facility 190 of an example audience measurement entity via an example gateway 140 and an example network 180. In some examples, the meter 114 is referred to as an audience measurement device. In the illustrated example, the media monitoring system includes the meter 114 and the central facility 190. In the illustrated example, the central facility 190 is structured to implement signature matching with meter data aggregation for media identification in accordance with teachings of this disclosure. An example implementation of such a central facility 190 is illustrated in FIGS. 2-3, which are described in further detail below.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In some examples, the media presentation device 110 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Systeme Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media presentation device 110 (e.g., near a television set). In some examples, more complex installation activities may be performed such as, for example, affixing the meter 114 to the media presentation device 110, electronically connecting the meter 114 to the media presentation device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner, such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 generates signatures (sometimes referred to as fingerprints) from the presented media (e.g., from audio output from the media presentation device 110), as described above. Example signature generation techniques that may be implemented by the meter 114 include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S.

Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

Depending on the type(s) of metering the meter 114 is to perform, the meter 114 can be physically coupled to the media presentation device 110 or may be configured to capture audio emitted externally by the media presenting device 110 (e.g., free field audio) such that direct physical coupling to the media presenting device 110 is not required. For example, the meter 114 of the illustrated example may employ non-invasive monitoring not involving any physical connection to the media presentation device 110 (e.g., via Bluetooth® connection, WIFI® connection, acoustic sensing via one or more microphone(s) and/or other acoustic sensor(s), etc.) and/or invasive monitoring involving one or more physical connections to the media presentation device 110 (e.g., via USB connection, a High Definition Media Interface (HDMI) connection, an Ethernet cable connection, etc.).

In examples disclosed herein, to monitor media presented by the media presentation device 110, the meter 114 of the illustrated example senses audio (e.g., acoustic signals or ambient audio) output (e.g., emitted) by the media presentation device 110. For example, the meter 114 processes the signals obtained from the media presentation device 110 to detect media and/or generate source identifying signatures (e.g., audio signatures) from portion(s) (e.g., audio portions) of the media presented by the media presentation device 110. To, for example, sense ambient audio output by the media presentation device 110, the meter 114 of the illustrated example includes an example acoustic sensor (e.g., a microphone). In some examples, the meter 114 may process audio signals obtained from the media presentation device 110 via a direct cable connection to detect media and/or generate source identifying audio signatures from such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically and/or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be compiled with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example, a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example meter 114 of FIG. 1 sends media identification data and/or audience identification data to the central facility 190 periodically, a-periodically and/or upon request by the central facility 190.

The example gateway 140 of the illustrated example of FIG. 1 can be implemented by a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc., to transmit and/or receive data via the Internet. Alternatively, the gateway 140 may be coupled to such a LAN.

The network 180 of the illustrated example can be implemented by a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation, such as, for example, on a side of the media presentation device 110, on the bottom of the media presentation device 110, and/or may not be affixed to the media presentation device 110. For example, the meter 114 may be placed in a location near the media presentation device 110.

A block diagram of an example implementation of the central facility 190 of FIG. 1 is illustrated in FIG. 2. The example central facility 190 of FIG. 2 includes an example meter data receiver 205, example meter data storage 210, an example asset matcher 215 and one or more example media monitoring applications 220. The meter data receiver 205 is structured to receive meter data from one or more meters, such as the meter 114 of FIG. 1. The meter data includes media identifying data and may also include people metering data, as described above. As such, the meter data receiver 205 includes a network interface, such as one or more network transceivers, network interface cards, etc., capable of communicating with the network 180 to receive the meter data reported by the meters.

In the illustrated example, the meter data received by the meter data receiver 205 from the meter 114 includes media identifying data in the form of a sequence of media signatures representative of media output from the monitored media presentation device 110. The media signatures generated by meters, such as the meter 114, are referred to herein as meter signatures to differentiate them from the reference signatures maintained at the central facility 190 to represent the known, reference media assets. In some examples, the meter 114 generates signatures from media (e.g., audio) output from the monitored media presentation device 110 at a sample rate. For example, the sample rate may correspond to a sampling interval of 5 seconds such that 12 signatures are generated each minute the meter 114 is active. In some examples, the meter 114 reports its meter data in batches corresponding to respective reporting intervals. For example, the reporting intervals may have a 5 minute duration, or any other duration, such that the meter 114 reports its meter data in 5 minute batches. In such examples, the meter data included in a batch for a given reporting interval includes a sequence of meter signatures generated by the meter 114 during that reporting interval, or otherwise associated with that reporting interval by the meter 114. For example, if the meter 114 generates signatures at a 5 second sample interval, then the batch of meter data reported by the meter 114 and received by the meter data receiver 205 for a given reporting interval would include a sequence of (5 minutes×12 signatures/minute)=60 meter signatures.

The example central facility 190 of FIG. 2 includes the meter data storage 210 to store the meter data received by the meter data receiver 205 from meters including the meter 114. In the illustrated example, the meter data receiver 205 stores the batches of meter data received from the different meters (including the meter 114) such that each batch is identifiable to the respective meter that reported the batch, and such that the ordering of the batches from a given meter are maintained. As such, the meter data storage 210 can be implemented by any number(s), type(s) and/or combination(s) of memories, storage devices, etc. For example, the meter data storage 210 may be implemented by one or more databases to store batches of meter data including sequences of signatures in a manner such that batches or meter data are identifiable to their respective meters and the ordering of the batches of meter data for a given meter is maintained. Accordingly, the meter data receiver 205 is an example of means for receiving meter data from meters, and the meter data storage 210 is an example of means for storing meter data received from meters.

The example central facility 190 of FIG. 2 includes the asset matcher 215 to implement signature matching with meter data aggregation in accordance with teachings of this disclosure. The asset matcher 215 implements a combination of hash key matching and brute force signature matching to compare the sequences of meter signatures included in the batches of meter data reported by the meters, such as the meter 114. As described above, the asset matcher 215 generates hash keys, referred to herein as meter hash keys, from the meter signatures reported by a meter, such as the meter 114, and identifies matching reference hash keys in a reference hash table storing reference hash keys representative of reference media assets known to the central facility 190. Based on one or more validation criteria, the asset matcher 215 identifies one or more valid hash key matches between the meter hash keys and the reference hash keys. The asset matcher 215 then uses the one or more valid hash key matches as corresponding seed point(s) for initializing brute force signature matching. For example, for a valid hash key match, the asset matcher 215 seeds the brute force signature matching to compare the meter signatures in the meter data from the meter 114 with the reference signatures representative of the reference media asset identified by the reference hash keys corresponding to that valid hash key match. The asset matcher 215 also uses time information (e.g., timestamps as described in further detail below) associated with the reference hash keys in the valid hash key match and time information (e.g., timestamps as described in further detail below) associated with the matching meter hash keys to align the brute force signature matching of the sequence of meter signatures with the sequence of reference signatures representative of the reference media asset identified by the valid hash key match.

However, unlike prior signature matching systems, the asset matcher 215 does not limit the hash key matching to being performed on a reporting interval basis. As mentioned above, if hash key matching is performed independently on each batch of meter sequences included in each batch of meter data (e.g., on a reporting interval basis), noise may reduce the ability to find enough hash key matches to meet one or more validation criteria to be satisfied to ensure hash key matches do not result in excessive false match errors. If the one or more validation criteria are loosened to account for noise, excessive false match errors could substantially degrade signature matching performance because each false match would result in a round of unnecessary brute force signature matching.

Rather than loosening the validation criteria, the asset matcher 215 of the illustrated example implements meter data aggregation in which, for a given meter such as the meter 114, the sequences of meter signatures from multiple batches of meter data corresponding to successive reporting intervals are aggregated to form aggregated meter data corresponding to a monitoring interval having a longer duration than the individual reporting intervals. The asset matcher 215 performs hash key matching on the larger collection of meter hash keys generated from the larger sequence of meter signatures included in the aggregated meter data. The increased number of meter hash keys being used to identify matching reference hash keys increases the likelihood of finding sufficient hash key matches to yield valid hash key matches that satisfy the one or more validation criteria. Counterintuitively, rather than loosening the validation criteria, given the increased number of meter hash keys used for hash key matching, it may be possible to tighten the one or more validation criteria employed by the asset matcher 215 to further reduce the probability of false match errors.

In some examples, the asset matcher 215 also increases, relative to some prior systems, the duration of an identified reference asset to be compared with brute force matching. In some prior systems, after a reference media asset is identified by hash key matching, the brute force signature matching is limited to comparing the meter signatures with reference signatures corresponding to a relatively small window (e.g., +1-300 seconds or some other window of time) around the seed point identified by the hash key matching operation. Because prior systems may process each batch of meter data independently, there may be gaps in the matched meter signatures (e.g., if noise causes the hash key matching to not find a valid hash key match for a given reporting interval). In contrast with such prior systems, in some examples, when the asset matcher 215 identifies a reference media asset through hash key matching, the asset matcher 215 performs brute force signature matching over the sequence of reference signatures corresponding to the entire duration of the identified media asset. Thus, even if there are gaps in the times of the verified hash key matches, the asset matcher 215 can still match the meter signatures with the reference signatures for the identified reference media asset through such gaps. Accordingly, in addition to outputting media identification information, such as a media identifier, that identifies the reference media asset determined to have reference signatures matching the meter signatures (and, thus, which identifies the monitored media represented by the meter signatures), in some exampled the asset matcher 215 also outputs match duration information that specifies a duration of time over which at least a portion of the sequence of meter signatures matched the sequence of reference signatures for that reference media asset (and, thus, which represents the duration over which the monitored media corresponded to that reference media asset). Thus, the asset matcher 215 is an example of means for aggregating meter data and performing signature matching with aggregated meter data in accordance with teachings of this disclosure.

In the illustrated example, the example central facility 190 includes one or more media monitoring applications 220 to process the media identification information and match duration information output by the asset matcher 215 to perform one or more operations based on that information. For example, the media monitoring application(s) 220 may include a media crediting application to credit media exposure at the media presentation environment 102 to the reference media asset represented by the media identification information output by the asset matcher 215 and for an amount of time represented by the match duration information output by the asset matcher 215. Additionally or alternatively, the media monitoring application(s) 220 may include one or more dynamic advertisement insertion applications to utilize the media identification information output by the asset matcher 215 to select companion media, targeted commercials, etc., to provide to the media presentation device 110 for presentation. Additionally or alternatively, the media monitoring application(s) 220 may include one or more secondary media selection insertion applications to utilize the media identification information output by the asset matcher 215 to select secondary media to provide to secondary media devices (e.g., such as a smartphone and/or computer associated with one or more of the panelists 104, 106) for presentation in association with the monitored media being presented by the media presentation device 110.

Figure 5:
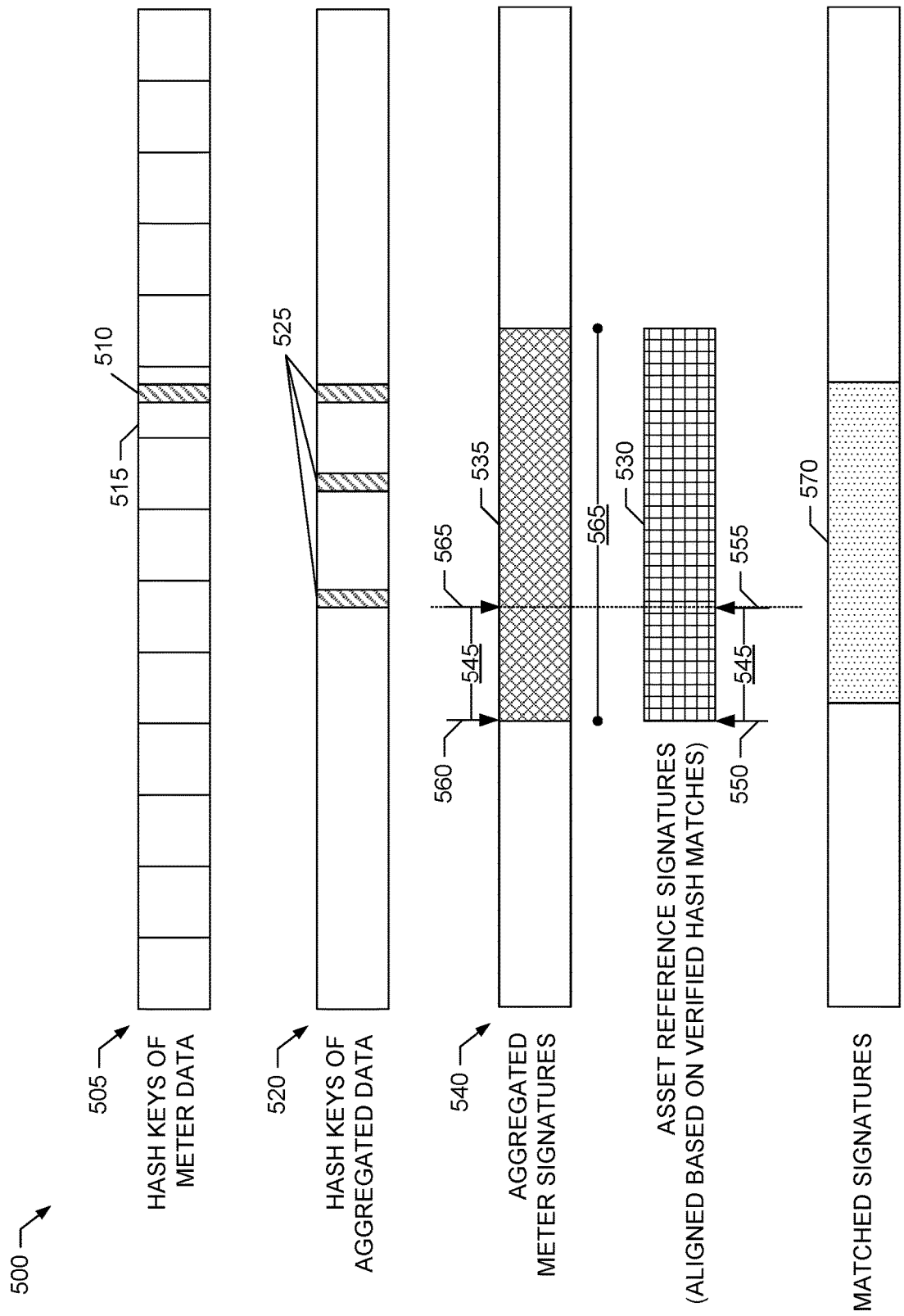

An example implementation of the asset matcher 215 of FIG. 2 is illustrated in FIG. 3. The example asset matcher 215 of FIG. 3 includes an example match job aggregator 305, an example hash generator 310, an example hash matcher 315, an example asset hash database 320, an example signature matcher 325 and an example asset signature database 330. The example asset matcher 215 of FIG. 3 includes the match job aggregator 305 to access the meter data storage 210 and aggregate batches of meter data from a meter, such as the meter 114, to form aggregated meter data associated with the meter 114. As described above, the individual batches of meter data correspond to respective reporting intervals having a first duration, such as a 5 minute reporting interval duration, some other fraction of a twenty-four hour period, or some other reporting interval duration. In some examples, the durations of the respective reporting intervals may be the same, whereas in other examples the durations of some or all of the respective reporting intervals may be different. The resulting aggregated meter data corresponds to a monitoring interval having a second duration larger than the first duration. For example, the duration of the monitoring interval represented by the aggregated meter data may be a twenty-four hour period or some other monitoring interval duration. The resulting aggregated meter data determined by the match job aggregator 305 includes an aggregated sequence of meter signatures that is an aggregation of the respective sequences of meter signatures included in the corresponding batches of meter data that underwent aggregation. Thus, the aggregated sequence of meter signatures represent the meter signatures collected and reported by the meter 114 over the aggregate monitoring interval having the second duration (e.g., 24 hours), whereas the component sequences of meter signatures included in the corresponding batches of meter data that underwent aggregation cover their respective individual reporting intervals having the first duration (e.g., 5 minutes). An example operation of the match job aggregator 305 to aggregate meter data from the meter 114 is illustrated in FIG. 5, which is described in further detail below. Accordingly, the match job aggregator 305 is an example of means for aggregating batches of meter data from a meter to form aggregated meter data associated with the meter.

The example asset matcher 215 of FIG. 3 includes the hash generator 310 to generate meter hash keys from the meter signatures included in the aggregate meter data formed by the match job aggregator 305. The hash generator 310 may implement any number(s), type(s) or combination(s) of hashing algorithms to hash individual meter signatures or combinations of meter signatures included in aggregate sequence of meter signatures included in the aggregate meter data to form a corresponding sequence of meter hash keys. In some examples, the meter signatures included in the aggregate meter data each include a data value determined by the meter 114 from one or more characteristics of the monitored media signal (e.g., such as one or more frequency components, amplitude components, zero crossing transitions, etc., of the monitored media signal), and a timestamp representing the time at which the particular signature was generated/collected by the meter 114. In such examples, the meter hash keys generated by the hash generator 310 each include a hash value determined based on data values of the one or more meter signatures used to generate a particular meter hash key, and a hash key timestamp corresponding to a timestamp of the one or more meter signatures used to generate the particular meter hash key.

For example, a typical hashing algorithm is based on a cryptographic process that transforms input data (which may have a fixed or variable size) to an output hash value that has a fixed size, which is usually smaller than the size of the input data. Hashing algorithms are generally constructed to yield relatively unique output hash value for different input data, but the fact that the output hash value has a smaller data size the input data means that some different input data may be transformed to the same hash value, which is referred to as a hash collision. Examples of hashing algorithms that may be implemented by the hash generator 310 include, but are not limited to, the SHA-1 hashing algorithm, the MD4 hashing algorithm, the MD5 hashing algorithm, etc.

In some examples, the hash generator 310 generates a respective meter hash key for each individual meter signature included in the aggregate meter data formed by the match job aggregator 305. In such examples, each meter hash key includes a hash value determined by processing the data value of its corresponding meter signature with the one or more hash algorithms implemented by the hash generator 310, and a hash key timestamp corresponding to the timestamp of its corresponding signature. In some examples, the hash generator 310 generates respective meter hash keys for corresponding groups of individual meter signature included in the aggregate meter data formed by the match job aggregator 305. For example, the hash generator 310 may generate a respective meter hash key for each group of 5, or 8, or some other number of meter signatures. In some such examples, a meter hash key includes a hash value determined by processing the combination of data values (e.g., a concatenation of the data values) of the meter signatures included in the group corresponding to that meter hash key with the one or more hash algorithms implemented by the hash generator 310, and a hash key timestamp corresponding to the timestamp representative of its corresponding group of meter signatures (e.g., such as the timestamp of the first meter signature in the groups, the timestamp of the last meter signature in the group, the timestamp of the median signature in the group, and average of the timestamps of the meter signatures included in the group, etc.) Accordingly, the hash generator 310 is an example of means for generating meter hash keys from meter signatures in aggregated meter data.

The example asset matcher 215 of FIG. 3 includes the hash matcher 315 to identify valid hash key match(es) between the meter hash keys generated by the hash generator 310 from the meter signatures in the aggregated meter data formed by the match job aggregator 305, and reference hash keys corresponding to a collection of reference media assets maintained by the central facility 190. In the illustrated example, the reference hash keys corresponding to the collection of reference media assets are stored in the asset hash database 320. The reference hash keys stored in the asset hash database 320 are generated from reference signatures representative of the collection of reference media assets in a manner similar to the way in which the meter hash keys are generated by the hash generator 310, such that a meter hash key and a reference hash key generated from matching meter signatures and reference signatures would also match. For example, for each reference media asset maintained by the central facility 190, the asset hash database 320 stores a corresponding sequence of reference hash keys representative of that reference media asset. Each reference hash key in such an example includes a hash value determined by processing, with the one or more hash algorithms, the data value(s) of the reference signature(s) corresponding to that reference hash key, a hash key timestamp corresponding to the timestamp representative of the reference signature(s) corresponding to that reference hash key, and a media identifier that identifies the particular reference media asset corresponding to that reference hash key. As such, the asset hash database storage 210 can be implemented by any number(s), type(s) and/or combination(s) of memories, storage devices, etc. For example, the asset hash database storage 210 may be implemented by one or more databases that arrange the reference hash keys in hash tables that are indexed by the hash values of the reference hash keys, and point to the reference signature(s) and corresponding reference media asset(s) represented by the reference hash keys. Accordingly, the asset hash database storage 210 is an example of means for storing reference hash keys.

Figure 4:
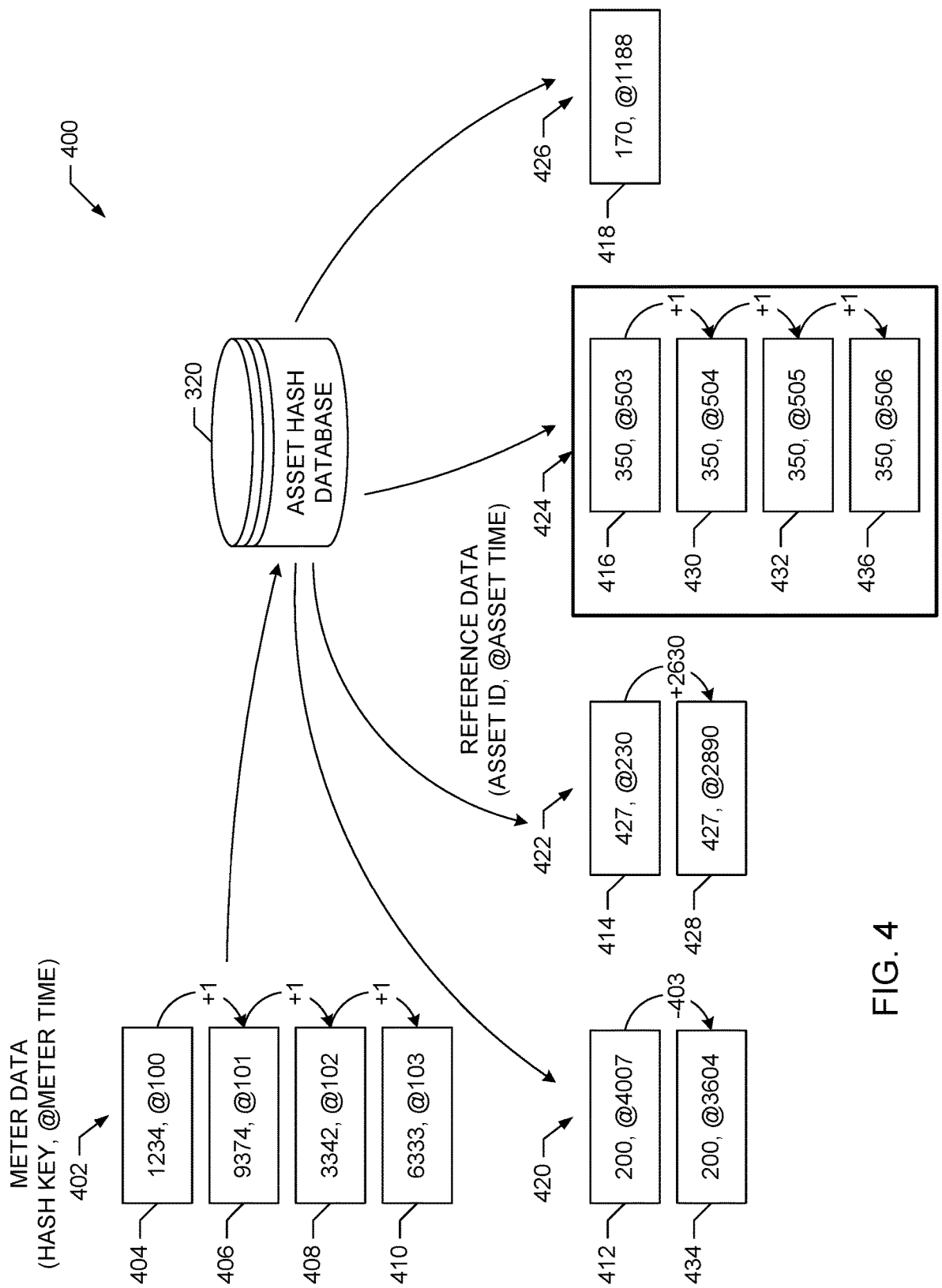
FIGS. 4-5 illustrate example operation of the asset matcher of FIGS. 2 and/or 3 to perform signature matching with meter data aggregation for media identification in accordance with teachings of this disclosure.

In the illustrated example, the hash matcher 315 uses the sequence of meter hash keys generated by the hash generator 310 from the aggregated sequence of meter signatures in the aggregated meter data to identify matching reference hash keys in the asset hash database 320. In some examples, the hash matcher 315 maintains respective data structures (e.g., data buckets, linked lists, array, etc.) for the different reference media assets for which reference hash keys matching the meter hash keys are found. For example, for a given meter hash key, the hash matcher 315 identifies the matching reference hash key(s) in the asset hash database 320 and stores each matching reference hash key in a respective data structure corresponding to the media identifier of the reference media asset corresponding to that matching reference hash key. As matching reference hash keys are added to its data structures, the hash matcher 315 compares the sequence of meter hash keys processed so far with the sequence(s) of matching reference hash keys stored in the data structure(s) for the different reference media asset(s) to determine whether one or more validation criteria are met. For example, the validation criteria may include a first example validation criterion requiring a first threshold number (e.g., 10 or some other number) of matching reference hash keys covering a first threshold timestamp range (e.g., 4 seconds or some other duration) to be included in the data structure for a given reference media asset for the group of matching reference hash keys corresponding to that reference media asset to be considered a valid hash key match. A second validation criterion may require that, once the first validation criterion is met for the group of matching reference hash keys corresponding to a given reference media asset, a second threshold number of matching reference hash keys (e.g., 5 or some other number) covering a second threshold timestamp range (e.g., 15 seconds or some other duration) and having a timestamp progression that matches the timestamp progression of the matching meter hash keys is to be included in the data structure for the given reference media asset for the group of matching reference hash keys corresponding to that reference media asset to be considered a valid hash key match. Because the meter hash keys and the reference hash keys are each associated with respective timestamps, the hash matcher 315 can examine the progression of timestamps of matching meter hash keys and matching reference hash keys to further confirm that a group of matching reference hash keys corresponding to a given reference media asset corresponds to a valid hash key match. Example operations of the hash matcher 315 to identify valid hash key match(es) between meter hash keys and reference hash keys are illustrated in FIGS. 4 and 5, which are described in further detail below. Accordingly, the hash matcher 315 is an example of means for identifying valid hash key match(es) between meter hash keys and reference hash keys.

The example asset matcher 215 of FIG. 3 includes the signature matcher 325 to perform brute-force signature matching between a sequence of reference signatures corresponding to a valid hash key match identified by the hash matcher 315, and a corresponding sequence of the meter signatures included in the aggregated meter data formed by the match job aggregator 305. In the illustrated example, the signature matcher 325 uses the valid hash key match(es) identified by the hash matcher 315 as seed points to select sequence(s) of reference signatures from the reference signature database 330 to compare with the meter signatures included in the aggregated meter data. In the illustrated example, the reference signature database 330 stores respective sequences of reference signatures representative of corresponding reference media assets in the collection of reference media assets maintained by the central facility 190. In some examples, the reference signatures for a given reference media asset are determined in a manner similar to the way in which the meter signatures are generated. In such examples, the sequence of reference signatures for a given reference media asset each include a data value determined from one or more characteristics of the reference media asset (e.g., such as one or more frequency components, amplitude components, zero crossing transitions, etc., of a media signal, such as an audio signal, of the reference media asset), and a timestamp representing the time in the reference media asset represented by that reference signature (e.g., corresponding to the portion of the reference media asset used to generate that reference signature). As such, the reference signature database 330 can be implemented by any number (s), type(s) and/or combination(s) of memories, storage devices, etc. For example, the reference signature database 330 may be implemented by one or more databases that store the sequences of reference signatures in a manner such that the sequences of reference signatures are identifiable to their respective reference media assets and the ordering of the sequence of reference signatures for a given reference media asset is maintained. Accordingly, the reference signature database 330 is an example of means for storing reference signatures representative of reference media assets.

In the illustrated examples, the signature matcher 325 aligns, based on the valid hash key match identified by the hash matcher 315, (i) a sequence of reference signatures corresponding to a duration of a reference media asset associated with the valid hash key match with (ii) a corresponding sequence of the meter signatures in the aggregated meter data. For example, the signature matcher 325 may select the sequence of reference signatures from the reference signature database 330 to correspond to an entirety of the reference media asset associated with the valid hash key match. In the illustrated example, after aligning the selected sequence of reference signatures with the corresponding sequence of meter signatures, the signature matcher 325 compares the sequence of reference signatures with the corresponding sequence of meter signatures to identify the monitored media represented by at least a portion of the sequence of the meter signatures determined to match a corresponding portion of the sequence of reference signatures. For example, the signature matcher 325 may implement any matching algorithm, such as a correlation algorithm, a distance comparison, etc., to compare the sequence of reference signatures representative of the selected reference media asset with the corresponding aligned sequence of meter signatures taken from the aggregated meter data to determine where the two sequences match. For the portion of the metered signatures determined to match the reference signatures, the signature matcher 325 outputs the media identifier of the reference media asset to identify the monitored media corresponding to that portion of matching meter signatures. In some examples, the signature matcher 325 also outputs duration information corresponding to the duration of time represented by the portion of matching meter signatures (e.g., to identify the portion of the reference media asset corresponding to the monitored media).

In some examples, the signature matcher 325 aligns, based on the valid hash key match identified by the hash matcher 315, (i) the sequence of reference signatures corresponding to the reference media asset associated with the valid hash key match with (ii) the corresponding sequence of the meter signatures in the aggregated meter data as follows. After selecting the sequence of reference signatures corresponding to the reference media asset associated with the valid hash key match from the reference signature database 330, the signature matcher 325 identifies a number of signatures from (i) an initial reference signature of the sequence of reference signatures corresponding to the selected duration (e.g., the entirety or some portion) of the reference media asset to (ii) a reference signature in the sequence of reference signatures that corresponds to an initial reference hash key in the sequence of reference hash keys corresponding to the valid hash key match. The signature matcher 325 then identifies an initial meter signature of the sequence of meter signatures to be a first meter signature in the aggregated meter data that precedes, by the determined number of signatures, a second meter signature in the aggregated meter data that corresponds to an initial meter hash key in the sequence of the meter hash keys corresponding to the valid hash key match. The signature matcher 325 then determines the sequence of meter signatures to begin with the initial meter signature and include a same number of signatures as the sequence of reference signatures. An example operation of the signature matcher 325 to compare, based on a valid hash key match, a sequence of reference signatures with a corresponding sequence of meter signatures form aggregate meter data is illustrated in FIG. 5, which is described in further detail below. Accordingly, the signature matcher 325 is an example of means for comparing, based on a valid hash key match, a sequence of reference signatures with a corresponding sequence of meter signatures form aggregate meter data.

FIG. 4 illustrates an example operation 400 of the hash matcher 315 to identify valid hash key match(es) between meter hash keys generated from meter signatures representative of media monitored by the meter 114 and reference hash keys generated from reference signatures representative of a collection of reference media assets maintained by the central facility 190. In the illustrated example of FIG. 4, the hash generator 325 has generated an example sequence of meter hash keys 402 from meter signatures included in the aggregated meter data formed by the match job aggregator 305. The sequence of meter hash keys 402 includes example meter hash keys 404, 406, 408 and 410, each of which includes a respective hash value and timestamp, as described above. In the illustrated example operation 400, the hash matcher 315 performs a lookup in the asset hash database 320 for reference hash key(s) matching the meter hash key 404. In the illustrated example, the hash matcher 315 identifies four example reference hash keys 412, 414, 416 and 418 that match the meter hash key 404 (e.g., due to hash collisions). The reference hash keys 412, 414, 416 and 418 are associated with corresponding reference media assets having respective media identifiers 200, 427, 350 and 170. Thus, the hash matcher 315 creates four example data structures (e.g., data buckets) 420, 422, 424 and 426 to store the matching reference hash keys corresponding to media identifiers 200, 427, 350 and 170, respectively, as shown.

Next, in the illustrated example operation 400, the hash matcher 315 performs a lookup in the asset hash database 320 for reference hash key(s) matching the meter hash key 406. In the illustrated example, the hash matcher 315 identifies two example reference hash keys 428 and 430 that match the meter hash key 406 (e.g., due to hash collisions). The reference hash keys 428 and 430 are associated with corresponding reference media assets having respective media identifiers 427 and 350. Thus, the hash matcher 315 stores the matching reference hash key 428 in the data structure 422 associated with media identifier 427, and stores the matching reference hash key 430 in the data structure 424 associated with media identifier 350.

Next, in the illustrated example operation 400, the hash matcher 315 performs a lookup in the asset hash database 320 for reference hash key(s) matching the meter hash key 408. In the illustrated example, the hash matcher 315 identifies one example reference hash key 432 that matches the meter hash key 408. The reference hash key 432 is associated with the corresponding reference media asset having media identifier 350. Thus, the hash matcher 315 stores the matching reference hash key 432 in the data structure 424 associated with media identifier 350.

Next, in the illustrated example operation 400, the hash matcher 315 performs a lookup in the asset hash database 320 for reference hash key(s) matching the meter hash key 410. In the illustrated example, the hash matcher 315 identifies two example reference hash keys 434 and 436 that match the meter hash key 410 (e.g., due to hash collisions). The reference hash keys 434 and 436 are associated with corresponding reference media assets having respective media identifiers 200 and 350. Thus, the hash matcher 315 stores the matching reference hash key 434 in the data structure 420 associated with media identifier 200, and stores the matching reference hash key 436 in the data structure 424 associated with media identifier 350.

Next, in the illustrated example operation 400, the hash matcher 315 evaluates the data structures 420, 422, 424 and 426 for the different reference media assets identified by media identifiers 200, 427, 350 and 170, respectively, to determine whether any of the sequences of matching reference hash keys compared with the sequence of meter hash keys 402 corresponds to a valid hash key match. In the illustrated example, the hash matcher 315 determines that the sequence of matching reference hash keys 416, 430, 432 and 436 stored in the data structure 424 of reference media asset 350 correspond to a valid hash key match with the sequence of meter hash keys 402 because the sequence of matching reference hash keys 416, 430, 432 and 436 stored in the data structure 424 satisfies one or more validation criteria. For example, the sequence of matching reference hash keys 416, 430, 432 and 436 stored in the data structure 424 include at least a threshold number of matching hash keys, which satisfies a first validation criterion, and exhibit a time progression that matches the time progression of the sequence of meter hash keys 402. In the illustrated example operation 400, the hash matcher 315 determines that the other data structures 420, 422 and 426 do not correspond to valid hash key matches. Thus, in the illustrated example, the hash matcher 315 identifies the data structure 424 as a valid hash key match, and outputs the reference asset identifier 350 and the reference timestamp range of 503 to 506 as the seed point to be used by the signature matcher 325 to select the sequence of reference signatures for brute force signature comparison.

FIG. 5 illustrates an example operation 500 performed by the asset matcher 215 to implement signature matching with meter data aggregation in accordance with teachings of this disclosure. The example operation 500 begins with the meter data receiver 205 storing batches of meter data 505 corresponding to respective reporting intervals in the meter data storage 210. In the illustrated example, if the asset matcher 215 did not perform meter data aggregation as disclosed herein, the asset matcher 215 would find just one valid hash key match 510 associated with an example batch of meter data 515. However, in the illustrated example operation 500, the asset matcher does perform meter aggregation. For example, the match job aggregator 305 aggregates the batches of meter data 505 to form example aggregated meter data. In the illustrated example, the hash generator 310 generates meter hash keys 520 from the meter signatures included in the aggregated meter data, and the hash matcher 315 identifies three example valid hash key matches 525 using the aggregated sequence of meter hash keys 520. For example, assume that the single valid hash key match 510 corresponds to the valid hash key match associated with the sequence of matching reference hash keys 416, 430, 432 and 436 stored in the data structure 424 of FIG. 4. However, because the hash matcher 315 can evaluate more meter hash keys 520 generated from the aggregated meter data (instead of being limited to just the batch of meter data 515), the hash matcher 315 in the illustrated example of FIG. 5 finds two more groups of reference hash keys associated with media identifier 350 that match corresponding meter hash keys, but with gaps in the timestamps between the different groups of matching hash keys. However, because all of those matching reference hash keys are stored in the data structure 424 associated with reference media asset 350, they contribute to the validation criteria. Thus, in the illustrated example, the hash matcher 315 is able to identify three groups of matching reference hash keys associated with reference media asset 350, even if two of those groups would not have individually satisfied the validation criteria.

Next, using the valid hash key matches 525 as seed points, the signature matcher 325 selects an example sequence of reference signatures 530 representative of a duration (e.g., an entirety or some portion) of the reference media asset corresponding to the valid hash key matches 525 (e.g., reference media asset 350 in the illustrated example). The signature matcher 325 then aligns, as described above, the sequence of reference signatures 530 with a corresponding example sequence of meter signatures 535 in the example aggregated sequence of meter signatures 540 included in the aggregated meter data. For example, the signature matcher 325 identifies an example number of signatures 545 from (i) an initial reference signature 550 of the sequence of reference signatures 530 corresponding to the selected duration (e.g., the entirety or some portion) of the reference media asset associated with the first of the valid hash key matches 525 to (ii) a reference signature 555 in the sequence of reference signatures 530 that corresponds to an initial reference hash key in the sequence of reference hash keys corresponding to first of the valid hash key matches 525. The signature matcher 325 then identifies an initial meter signature 560 of the sequence of meter signatures 540 in the aggregated meter data for the meter being processed to be a first meter signature in the aggregated meter data that precedes, by the same determined number of signatures 545, a second meter signature 565 in the aggregated meter data that corresponds to an initial meter hash key in the sequence of the meter hash keys corresponding to first of the valid hash key matched 525. The signature matcher 325 then determines the corresponding sequence of meter signatures 535 for brute-force signature matching to begin with the initial meter signature 560 and include a same number of signatures 565 as the sequence of reference signatures 530.

Next, the signature matcher 325 performs brute-force signature matching to compare the sequence of reference signatures 530 with the corresponding sequence of meter signatures 535 to identify a matching portion of the meter signatures 570. The signature matcher 325 then outputs the media identifier of the matching reference media asset (e.g., media identifier 350 in the illustrated example) and the duration of the matching portion of the meter signatures 570 to identify the monitored media corresponding to that portion of the matching portion of the meter signatures 570.

While an example manner of implementing the central facility 190 is illustrated in FIGS. 1-5, one or more of the elements, processes and/or devices illustrated in FIGS. 1-5 may be combined, divided, re-arranged, omitted, eliminated and/or implemented in any other way. Further, the example meter data receiver 205, the example meter data storage 210, the example asset matcher 215 the example media monitoring application(s) 220, the example match job aggregator 305, the example hash generator 310, the example hash matcher 315, the example asset hash database 320, the example signature matcher 325, the example asset signature database 330 and/or, more generally, the example central facility 190 of FIGS. 1-5 may be implemented by hardware, software, firmware and/or any combination of hardware, software and/or firmware. Thus, for example, any of the example meter data receiver 205, the example meter data storage 210, the example asset matcher 215 the example media monitoring application(s) 220, the example match job aggregator 305, the example hash generator 310, the example hash matcher 315, the example asset hash database 320, the example signature matcher 325, the example asset signature database 330 and/or, more generally, the example central facility 190 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example central facility 190, the example meter data receiver 205, the example meter data storage 210, the example asset matcher 215 the example media monitoring application(s) 220, the example match job aggregator 305, the example hash generator 310, the example hash matcher 315, the example asset hash database 320, the example signature matcher 325 and/or the example asset signature database 330 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 190 may include one or more elements, processes and/or devices in addition to, or instead of, those illustrated in FIGS. 1-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
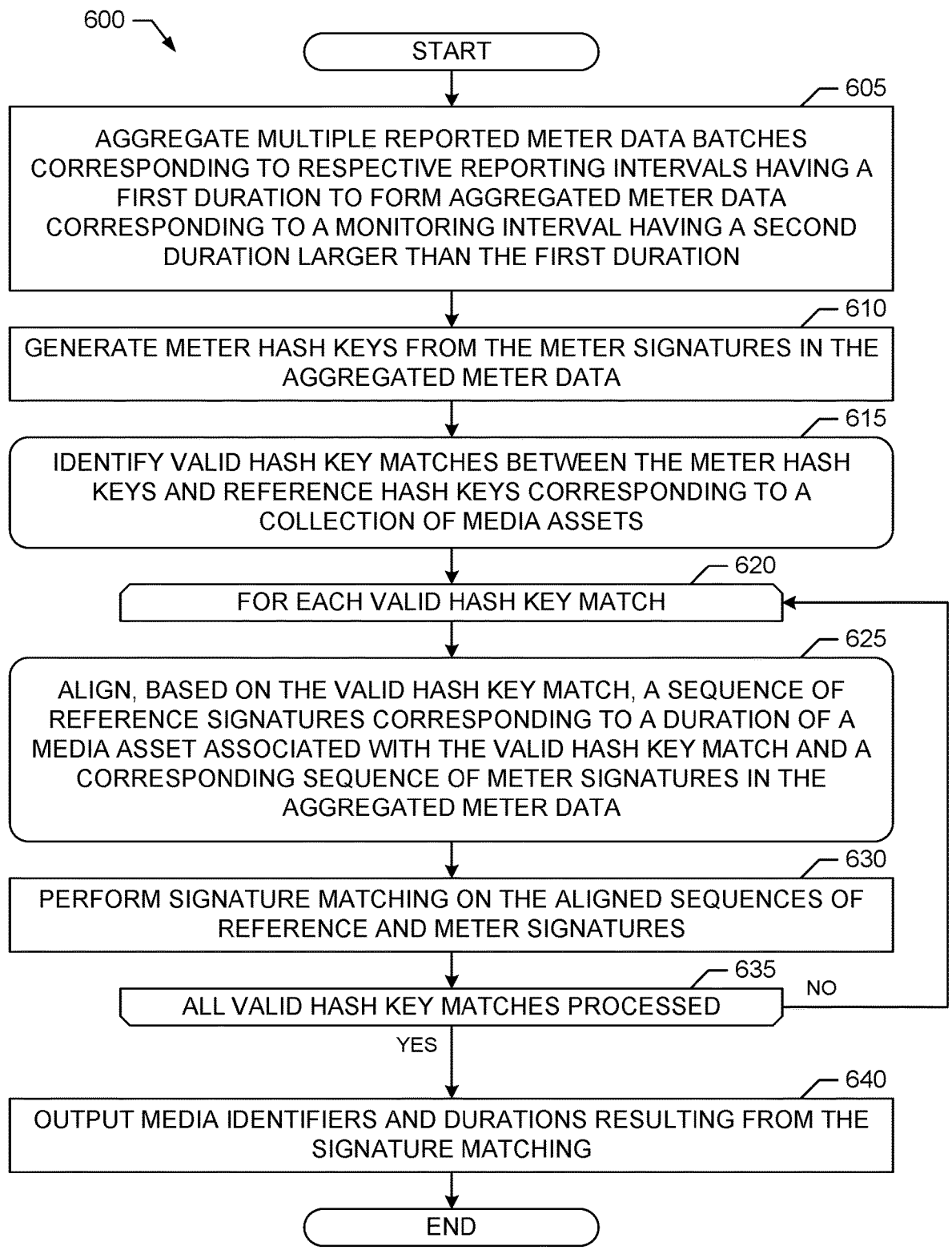
FIG. 6 is a flowchart representative of example computer readable instructions that may be executed to implement the example asset matcher of FIGS. 2 and/or 3.
Figure 7:
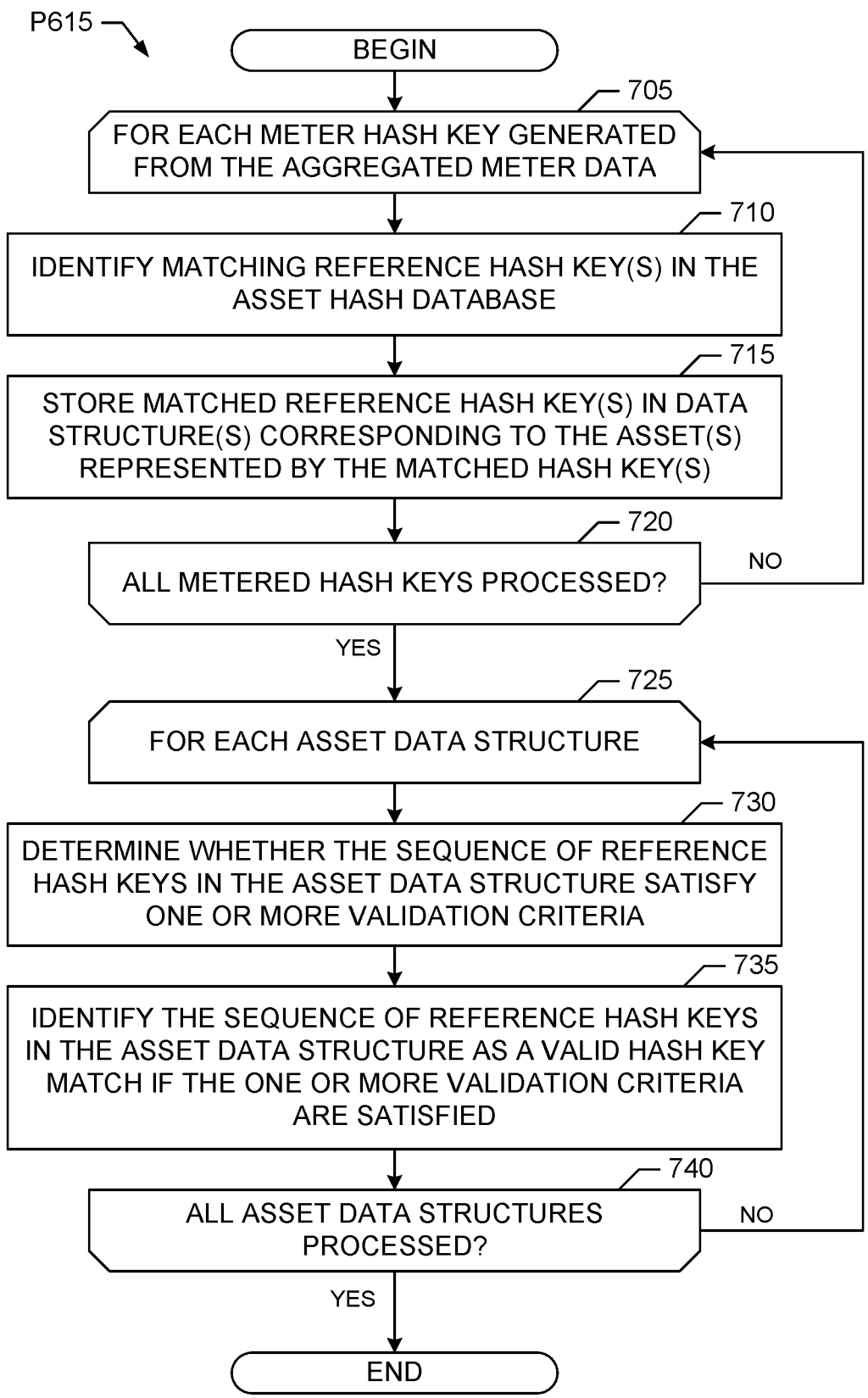
FIG. 7 is a flowchart representative of example machine readable instructions that may be executed to implement an example hash matcher included in the example asset matcher of FIG. 3.
Figure 8:
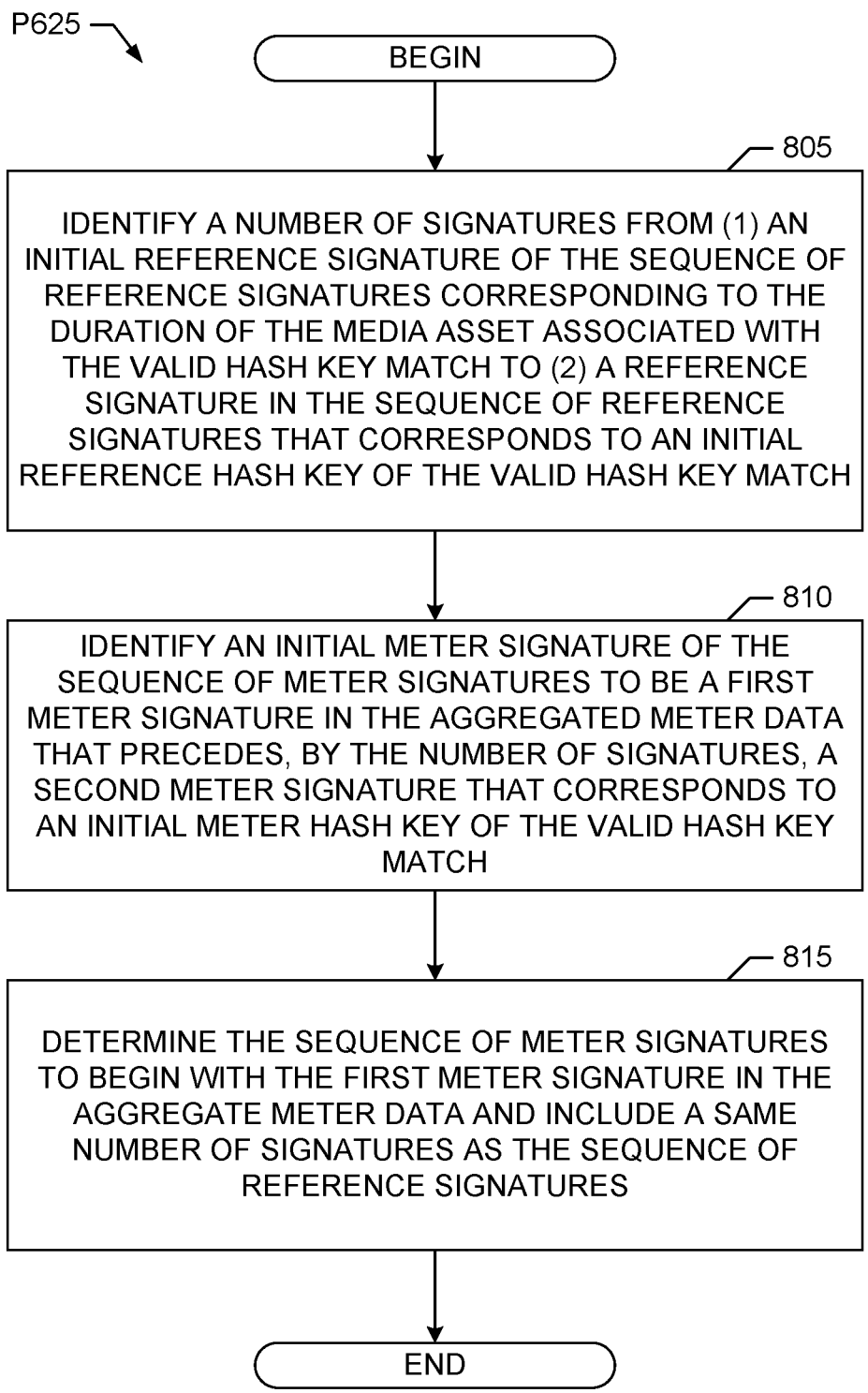
FIG. 8 is a flowchart representative of example machine readable instructions that may be executed to implement an example signature matcher included in the example asset matcher of FIG. 3.

Flowcharts representative of example hardware logic, machine readable instructions, hardware implemented state machines, and/or any combination thereof for implementing the example asset matcher 215 are shown in FIGS. 6-8. In these examples, the machine readable instructions may be one or more executable programs or portion(s) of an executable program for execution by a computer processor, such as the processor 912 shown in the example processor platform 900 discussed below in connection with FIG. 9. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 912, but the entire program or programs and/or parts thereof could alternatively be executed by a device other than the processor 912 and/or embodied in firmware or dedicated hardware. Further, although the example program(s) is(are) described with reference to the flowcharts illustrated in FIGS. 6-8, many other methods of implementing the example asset matcher 215 may alternatively be used. For example, with reference to the flowcharts illustrated in FIGS. 6-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 600 that may be executed to implement the example asset matcher 215 of FIGS. 2-3 is illustrated in FIG. 6. With reference to the preceding figures and associated written descriptions, the example program 600 of FIG. 6 begins execution at block 605 at which the example match job aggregator 305 of the asset matcher 215 aggregates, as described above, multiple batches of meter data reported from a meter and corresponding to respective reporting intervals having a first duration to form aggregated meter data corresponding to a monitoring interval having a second duration larger than the first duration. At block 610, the hash generator 310 generates, as described above, meter hash keys from the meter signatures included in the aggregated meter data. At block 615, the hash matcher 315 identifies, as described above, valid hash key match(es), if any, between the meter hash keys and reference hash keys corresponding to a collection of reference media assets. An example program that may be executed to implement the processing at block 615 is illustrated in FIG. 7, which is described in further detail below.

At block 620, the signature matcher 325 begins performing brute-force signature matching, as described above, based on seeds points corresponding to the valid hash key match(es) identified at block 615. For example, for a given valid hash key match, at block 620 the signature matcher 325 aligns, based on the valid hash key match and as described above, (i) a sequence or reference signatures corresponding to a duration (e.g., an entirety or some portion) of a reference media asset associated with the valid hash key match and (ii) a corresponding sequence of meter signatures in the aggregated meter data. An example program that may be executed to implement the processing at block 625 is illustrated in FIG. 8, which is described in further detail below.

At block 630, the signature matcher 325 performs, as described above, brute-force signature matching on the aligned sequence or reference signatures and corresponding meter signatures. At block 635, the signature matcher 325 continues performing brute-force signature matching until all of the valid hash key matches have been processed. At block 640, the signature matcher outputs, as described, media identifies and duration resulting from the signature matching, which identify the monitored media represented by the meter signatures in the aggregated meter data.

An example program P615 that may be executed to implement the processing at block 615 of FIG. 6 and/or the example hash matcher 315 of FIG. 3 is illustrated in FIG. 7. With reference to the preceding figures and associated written descriptions, the example program P615 of FIG. 7 begins execution at block 705 at which the hash matcher 315 begins processing each meter hash key generated from the meter signatures included in the aggregate meter data. For example, at block 710, the hash matcher 315 identifies, for a given meter key and as described above, any matching reference hash key(s) stored in the asset hash database 320. At block 715, the hash matcher 315 stores, as described above, the matched reference hash key(s) in data structure(s) corresponding to the reference media asset(s) represented by the matched hash key(s). At block 720, the hash matcher 315 continues processing the meter hash keys until all meter hash keys are processed.

At block 725, the hash matcher 315 evaluates the data structures for the different reference media assets associated with matching reference hash keys to identify any valid hash key matches. For example, at block 730, for a given reference media asset's data structure and as described above, the hash matcher 315 determines whether the sequence or reference hash keys in that data structure satisfy one or more validation criteria. At block 735, the hash matcher 315 identifies, as described above, the sequence of reference hash keys in that reference media asset's data structure if the one or more validation criteria are satisfied. At block 740, the hash matcher 315 continues examining the data structures for the different reference media assets until all of the data structures have been examined.

An example program P625 that may be executed to implement the processing at block 625 of FIG. 6 and/or signature sequence alignment in the example signature matcher 325 of FIG. 3 is illustrated in FIG. 8. With reference to the preceding figures and associated written descriptions, the example program P625 of FIG. 8 begins execution at block 805 at which the signature matcher 325 identifies, as described above, a number of signatures from (i) an initial reference signature of a sequence of reference signatures corresponding to a selected duration (e.g., the entirety or some portion) of a reference media asset associated with a valid hash key match to (ii) a reference signature in the sequence of reference signatures that corresponds to an initial reference hash key in the sequence of reference hash keys corresponding to the valid hash key match. At block 810, the signature matcher 325 identifies, as described above, an initial meter signature of the sequence of meter signatures in the aggregated meter data for the meter being processed to be a first meter signature in the aggregated meter data that precedes, by the determined number of signatures, a second meter signature in the aggregated meter data that corresponds to an initial meter hash key in the sequence of the meter hash keys corresponding to the valid hash key match. At block 815, the signature matcher 325 determines, as described above, the corresponding sequence of meter signatures for brute-force signature matching to begin with the initial meter signature and include a same number of signatures as the sequence of reference signatures.

Figure 9:
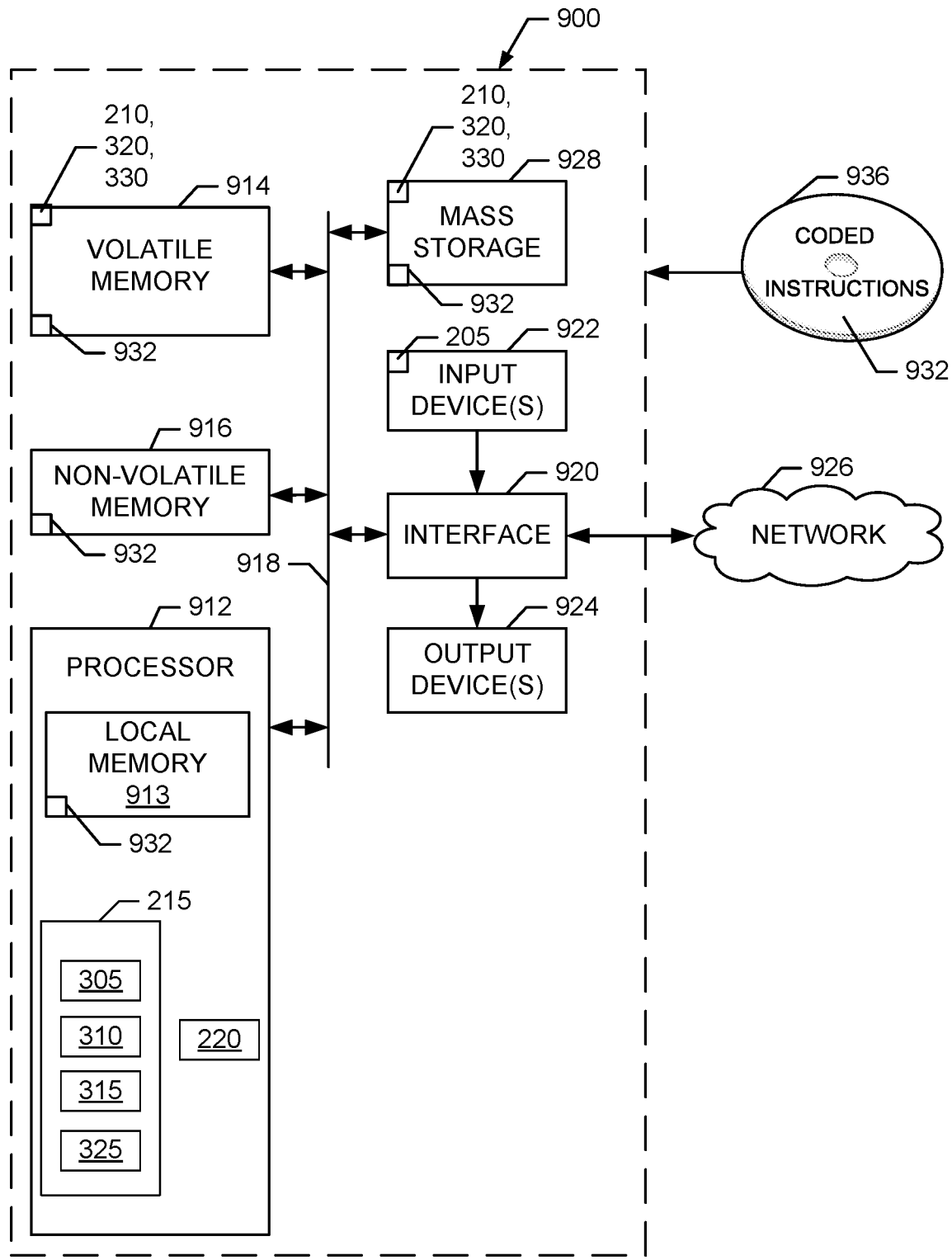
FIG. 9 is a block diagram of an example processor platform structured to execute the example machine readable instructions of FIGS. 6, 7 and/or 8 to implement the example asset matcher of FIGS. 2-3.

FIG. 9 is a block diagram of an example processor platform 900 structured to execute the instructions of FIGS. 6, 7 and/or 8 to implement the example central facility 190 of FIG. 1 and/or the example asset matcher 215 of FIGS. 2-3. The processor platform 900 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example asset matcher 215, the example match job aggregator 305, the example hash generator 310, the example hash matcher 315, the example signature matcher 325 and/or the example media monitoring application(s) 220.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc. In the illustrated example, the interface circuit 920 implements the example meter data receiver 205.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. In some examples, the mass storage device 928 may implement the example meter data storage 210, the example asset hash database 320 and/or the example asset signature database 330. Additionally or alternatively, in some examples the volatile memory 914 may implement the example meter data storage 210, the example asset hash database 320 and/or the example asset signature database 330.

The machine executable instructions 932 corresponding to the instructions of FIGS. 6-8 may be stored in the mass storage device 928, in the volatile memory 914, in the non-volatile memory 916, in the local memory 913 and/or on a removable non-transitory computer readable storage medium, such as a CD or DVD 936.

From the foregoing, it will be appreciated that example methods, apparatus and articles of manufacture have been disclosed that implement signature matching with meter data aggregation for use in media identification applications. The disclosed methods, apparatus and articles of manufacture improve the efficiency of using a computing device by combining meter data from multiple reporting intervals to form aggregated meter data covering a monitoring interval having a longer duration, and performing hash key matching over the aggregated monitoring interval, thereby increasing the opportunities for finding valid hash key matches to be used as seed points to target brute-force signature matching. The disclosed methods, apparatus and articles of manufacture also improve the efficiency of using a computing device by performing targeted brute-force signature matching over an entire reference media asset corresponding to a valid hash key match, rather than just the duration of the reporting interval, which can more fully credit exposure to the monitored media. The disclosed methods, apparatus and articles of manufacture are accordingly directed to one or more improvement(s) in the functioning of a computer.

The foregoing disclosure provides example solutions to implement signature matching with meter data aggregation for use in media identification applications. The following further examples, which include subject matter such as a media identification apparatus, a non-transitory computer readable medium, and a media identification method, are disclosed herein. The disclosed examples can be implemented individually and/or in one or more combinations.

Example 1 is a media identification apparatus including a match job aggregator to aggregate batches of meter data from a meter to form aggregated meter data associated with the meter, the batches of meter data corresponding to respective reporting intervals having a first duration, the aggregated meter data corresponding to a monitoring interval having a second duration larger than the first duration. The apparatus of example 1 also includes a hash matcher to identify a valid hash key match between meter hash keys generated from meter signatures in the aggregated meter data and reference hash keys corresponding to a collection of media assets. The apparatus of example 1 further includes a signature matcher to: (A) align, based on the valid hash key match, (i) a sequence of reference signatures corresponding to a duration of a first media asset associated with the valid hash key match with (ii) a corresponding sequence of the meter signatures in the aggregated meter data; and (B) compare the sequence of reference signatures and the corresponding sequence of meter signatures to identify media represented by at least a portion of the sequence of the meter signatures.

Example 2 includes the subject matter of example 1, wherein the signature matcher is to output (i) an identifier of the media represented by the at least the portion of the sequence of the meter signatures, and (ii) a third duration corresponding to a duration represented by the at least the portion of the sequence of the meter signatures, the signature matcher to output the identifier and the third duration to an application that is to perform an operation based on the identifier and the third duration.

Example 3 includes the subject matter of example 1 or example 2, wherein the second duration corresponds to a twenty-four period, and the first duration corresponds to a fraction of the twenty-four period.

Example 4 includes the subject matter of example 3, wherein the sequence of reference signatures corresponds to an entirety of the first media asset.

Example 5 includes the subject matter of any one of examples 1 to 4, and further includes a hash key generator to generate the meter hash keys from the meter signatures in the aggregated meter data.

Example 6 includes the subject matter of any one of examples 1 to 5, wherein the hash matcher is to: (i) identify, for a first one of the meter hash keys, a set of reference hash keys that match the first one of the meter hash keys; (ii) store ones of the set of reference hash keys in respective data structures corresponding to media assets represented by the ones of the set of reference hash keys, the media assets including the first media asset, a first one of the data structures corresponding to the first media asset, the first one of the data structures to include a sequence of reference hash keys that match a corresponding sequence of the meter hash keys; and (iii) determine that the first one of the sequence of reference hash keys included in the first one of the data structures corresponds to the valid hash key match when the sequence of reference hash keys and the corresponding sequence of the meter hash keys satisfy one or more validation criteria.

Example 7 includes the subject matter of example 6, wherein to align the sequence of reference signatures with the corresponding sequence of the meter signatures, the signature generator is to: (A) identify a first number of signatures from (i) an initial reference signature of the sequence of reference signatures corresponding to the duration of the first media asset to (ii) a reference signature in the sequence of reference signatures that corresponds to an initial reference hash key in the sequence of reference hash keys corresponding to the valid hash key match; (B) identify an initial meter signature of the sequence of meter signatures to be a first meter signature in the aggregated meter data that precedes, by the first number of signatures, a second meter signature in the aggregated meter data that corresponds to an initial meter hash key in the sequence of the meter hash keys corresponding to the valid hash key match; and (C) determine the sequence of meter hash keys to begin with the initial meter signature and include a same second number of signatures as the sequence of reference signatures.

Example 8 is a non-transitory computer readable medium including computer readable instructions that, when executed, cause a processor to at least: (A) aggregate batches of meter data from a meter to form aggregated meter data associated with the meter, the batches of meter data corresponding to respective reporting intervals having a first duration, the aggregated meter data corresponding to a monitoring interval having a second duration larger than the first duration; (B) identify a valid hash key match between meter hash keys generated from meter signatures in the aggregated meter data and reference hash keys corresponding to a collection of media assets; (C) align, based on the valid hash key match, (i) a sequence of reference signatures corresponding to a duration of a first media asset associated with the valid hash key match with (ii) a corresponding sequence of the meter signatures in the aggregated meter data; and (D) compare the sequence of reference signatures and the corresponding sequence of meter signatures to identify media represented by at least a portion of the sequence of the meter signatures.

Example 9 includes the subject matter of example 8, wherein the computer readable instructions, when executed, cause the processor to output (i) an identifier of the media represented by the at least the portion of the sequence of the meter signatures, and (ii) a third duration corresponding to a duration represented by the at least the portion of the sequence of the meter signatures, the instructions to cause the processor to output the identifier and the third duration to an application that is to perform an operation based on the identifier and the third duration.

Example 10 includes the subject matter of example 8 or example 9, wherein the second duration corresponds to a twenty-four period, and the first duration corresponds to a fraction of the twenty-four period.

Example 11 includes the subject matter of example 10, wherein the sequence of reference signatures corresponds to an entirety of the first media asset.

Example 12 includes the subject matter of any one of examples 8 to 11, wherein the computer readable instructions, when executed, cause the processor to generate the meter hash keys from the meter signatures in the aggregated meter data.

Example 13 includes the subject matter of any one of examples 8 to 12, wherein the computer readable instructions, when executed, cause the processor to: (i) identify, for a first one of the meter hash keys, a set of reference hash keys that match the first one of the meter hash keys; (ii) store ones of the set of reference hash keys in respective data structures corresponding to media assets represented by the ones of the set of reference hash keys, the media assets including the first media asset, a first one of the data structures corresponding to the first media asset, the first one of the data structures to include a sequence of reference hash keys that match a corresponding sequence of the meter hash keys; and (iii) determine that the first one of the sequence of reference hash keys included in the first one of the data structures corresponds to the valid hash key match when the sequence of reference hash keys and the corresponding sequence of the meter hash keys satisfy one or more validation criteria.

Example 14 includes the subject matter of example 13, wherein to align the sequence of reference signatures with the corresponding sequence of the meter signatures, the instructions, when executed, cause the processor to: (A) identify a first number of signatures from (i) an initial reference signature of the sequence of reference signatures corresponding to the duration of the first media asset to (ii) a reference signature in the sequence of reference signatures that corresponds to an initial reference hash key in the sequence of reference hash keys corresponding to the valid hash key match; (B) identify an initial meter signature of the sequence of meter signatures to be a first meter signature in the aggregated meter data that precedes, by the first number of signatures, a second meter signature in the aggregated meter data that corresponds to an initial meter hash key in the sequence of the meter hash keys corresponding to the valid hash key match; and (C) determine the sequence of meter hash keys to begin with the initial meter signature and include a same second number of signatures as the sequence of reference signatures.

Example 15 is a media identification method including aggregating batches of meter data from a meter to form aggregated meter data associated with the meter, the batches of meter data corresponding to respective reporting intervals having a first duration, the aggregated meter data corresponding to a monitoring interval having a second duration larger than the first duration. The method of example 15 also includes identifying, by executing an instruction with a processor, a valid hash key match between meter hash keys generated from meter signatures in the aggregated meter data and reference hash keys corresponding to a collection of media assets. The method of example 15 further includes aligning, based on the valid hash key match, (i) a sequence of reference signatures corresponding to a duration of a first media asset associated with the valid hash key match with (ii) a corresponding sequence of the meter signatures in the aggregated meter data. The method of example 15 also includes comparing, by executing an instruction with the processor, the sequence of reference signatures and the corresponding sequence of meter signatures to identify media represented by at least a portion of the sequence of the meter signatures.

Example 16 includes the subject matter of example 15, and further includes outputting (i) an identifier of the media represented by the at least the portion of the sequence of the meter signatures, and (ii) a third duration corresponding to a duration represented by the at least the portion of the sequence of the meter signatures, the identifier and the third duration to be output to an application that is to perform an operation based on the identifier and the third duration.

Example 17 includes the subject matter of example 15 or example 16, wherein the second duration corresponds to a twenty-four period, the first duration corresponds to a fraction of the twenty-four period, and the sequence of reference signatures corresponds to an entirety of the first media asset.

Example 18 includes the subject matter of any one of examples 15 to 17, and further includes generating the meter hash keys from the meter signatures in the aggregated meter data.

Example 19 includes the subject matter of any one of examples 15 to 18, and further includes: (i) identifying, for a first one of the meter hash keys, a set of reference hash keys that match the first one of the meter hash keys; (ii) storing ones of the set of reference hash keys in respective data structures corresponding to media assets represented by the ones of the set of reference hash keys, the media assets including the first media asset, a first one of the data structures corresponding to the first media asset, the first one of the data structures to include a sequence of reference hash keys that match a corresponding sequence of the meter hash keys; and (iii) determining that the first one of the sequence of reference hash keys included in the first one of the data structures corresponds to the valid hash key match when the sequence of reference hash keys and the corresponding sequence of the meter hash keys satisfy one or more validation criteria.

Example 20 includes the subject matter of example 19, wherein the aligning of the sequence of reference signatures with the corresponding sequence of the meter signatures includes: (A) identifying a first number of signatures from (i) an initial reference signature of the sequence of reference signatures corresponding to the duration of the first media asset to (ii) a reference signature in the sequence of reference signatures that corresponds to an initial reference hash key in the sequence of reference hash keys corresponding to the valid hash key match; (B) identifying an initial meter signature of the sequence of meter signatures to be a first meter signature in the aggregated meter data that precedes, by the first number of signatures, a second meter signature in the aggregated meter data that corresponds to an initial meter hash key in the sequence of the meter hash keys corresponding to the valid hash key match; and (C) determining the sequence of meter hash keys to begin with the initial meter signature and include a same second number of signatures as the sequence of reference signatures.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A media identification apparatus, the apparatus comprising:
    at least one memory;
    computer readable instructions; and
    at least one processor to execute the computer readable instructions to at least:
        aggregate batches of meter data from a meter to form aggregated meter data associated with the meter, the batches of meter data corresponding to respective reporting intervals having a first duration, the aggregated meter data corresponding to a monitoring interval having a second duration larger than the first duration;
        identify a valid hash key match between meter hash keys generated from meter signatures in the aggregated meter data and reference hash keys corresponding to a collection of media assets;
        align, based on the valid hash key match, (i) a sequence of reference signatures corresponding to a duration of a first media asset associated with the valid hash key match with (ii) a corresponding sequence of the meter signatures in the aggregated meter data; and
        compare the sequence of reference signatures and the corresponding sequence of the meter signatures to identify media represented by at least a portion of the sequence of the meter signatures.

2. The apparatus of claim 1, wherein the at least one processor is to output (i) an identifier of the media represented by the at least the portion of the sequence of the meter signatures, and (ii) a third duration corresponding to a duration represented by the at least the portion of the sequence of the meter signatures, the at least one processor to output the identifier and the third duration to an application that is to perform an operation based on the identifier and the third duration.

3. The apparatus of claim 1, wherein the second duration corresponds to a twenty-four period, and the first duration corresponds to a fraction of the twenty-four period.

4. The apparatus of claim 3, wherein the sequence of reference signatures corresponds to an entirety of the first media asset.

5. The apparatus of claim 1, wherein the at least one processor is to generate the meter hash keys from the meter signatures in the aggregated meter data.

6. The apparatus of claim 1, wherein the at least one processor is to:
    identify, for a first one of the meter hash keys, a set of reference hash keys that match the first one of the meter hash keys;
    store ones of the set of reference hash keys in respective data structures corresponding to media assets represented by the ones of the set of reference hash keys, the media assets including the first media asset, a first one of the data structures corresponding to the first media asset, the first one of the data structures to include a sequence of reference hash keys that match a corresponding sequence of the meter hash keys; and
    determine that the first one of the sequence of reference hash keys included in the first one of the data structures corresponds to the valid hash key match when the sequence of reference hash keys and the corresponding sequence of the meter hash keys satisfy one or more validation criteria.

7. The apparatus of claim 6, wherein to align the sequence of reference signatures with the corresponding sequence of the meter signatures, the at least one processor is to:
    identify a first number of signatures from (i) an initial reference signature of the sequence of reference signatures corresponding to the duration of the first media asset to (ii) a reference signature in the sequence of reference signatures that corresponds to an initial reference hash key in the sequence of reference hash keys corresponding to the valid hash key match;
    identify an initial meter signature of the sequence of the meter signatures to be a first meter signature in the aggregated meter data that precedes, by the first number of signatures, a second meter signature in the aggregated meter data that corresponds to an initial meter hash key in the sequence of the meter hash keys corresponding to the valid hash key match; and
    determine the sequence of the meter hash keys to begin with the initial meter signature and include a same second number of signatures as the sequence of reference signatures.

8. A non-transitory computer readable medium comprising computer readable instructions that, when executed, cause a processor to at least:

aggregate batches of meter data from a meter to form aggregated meter data associated with the meter, the batches of meter data corresponding to respective reporting intervals having a first duration, the aggregated meter data corresponding to a monitoring interval having a second duration larger than the first duration;

identify a valid hash key match between meter hash keys generated from meter signatures in the aggregated meter data and reference hash keys corresponding to a collection of media assets;

align, based on the valid hash key match, (i) a sequence of reference signatures corresponding to a duration of a first media asset associated with the valid hash key match with (ii) a corresponding sequence of the meter signatures in the aggregated meter data; and compare the sequence of reference signatures and the corresponding sequence of the meter signatures to identify media represented by at least a portion of the sequence of the meter signatures.

9. The non-transitory computer readable medium of claim 8, wherein the computer readable instructions, when executed, cause the processor to output (i) an identifier of the media represented by the at least the portion of the sequence of the meter signatures, and (ii) a third duration corresponding to a duration represented by the at least the portion of the sequence of the meter signatures, the instructions to cause the processor to output the identifier and the third duration to an application that is to perform an operation based on the identifier and the third duration.

10. The non-transitory computer readable medium of claim 8, wherein the second duration corresponds to a twenty-four period, and the first duration corresponds to a fraction of the twenty-four period.

11. The non-transitory computer readable medium of claim 10, wherein the sequence of reference signatures corresponds to an entirety of the first media asset.

12. The non-transitory computer readable medium of claim 8, wherein the computer readable instructions, when executed, cause the processor to generate the meter hash keys from the meter signatures in the aggregated meter data.

13. The non-transitory computer readable medium of claim 8, wherein the computer readable instructions, when executed, cause the processor to:

identify, for a first one of the meter hash keys, a set of reference hash keys that match the first one of the meter hash keys;

store ones of the set of reference hash keys in respective data structures corresponding to media assets represented by the ones of the set of reference hash keys, the media assets including the first media asset, a first one of the data structures corresponding to the first media asset, the first one of the data structures to include a sequence of reference hash keys that match a corresponding sequence of the meter hash keys; and determine that the first one of the sequence of reference hash keys included in the first one of the data structures corresponds to the valid hash key match when the sequence of reference hash keys and the corresponding sequence of the meter hash keys satisfy one or more validation criteria.

14. The non-transitory computer readable medium of claim 13, wherein to align the sequence of reference signatures with the corresponding sequence of the meter signatures, the instructions, when executed, cause the processor to:

identify a first number of signatures from (i) an initial reference signature of the sequence of reference signatures corresponding to the duration of the first media asset to (ii) a reference signature in the sequence of reference signatures that corresponds to an initial reference hash key in the sequence of reference hash keys corresponding to the valid hash key match;

identify an initial meter signature of the sequence of the meter signatures to be a first meter signature in the aggregated meter data that precedes, by the first number of signatures, a second meter signature in the aggregated meter data that corresponds to an initial meter hash key in the sequence of the meter hash keys corresponding to the valid hash key match; and determine the sequence of the meter hash keys to begin with the initial meter signature and include a same second number of signatures as the sequence of reference signatures.

15. A media identification method comprising:

aggregating batches of meter data from a meter to form aggregated meter data associated with the meter, the batches of meter data corresponding to respective reporting intervals having a first duration, the aggregated meter data corresponding to a monitoring interval having a second duration larger than the first duration;

identifying, by executing an instruction with a processor, a valid hash key match between meter hash keys generated from meter signatures in the aggregated meter data and reference hash keys corresponding to a collection of media assets;

aligning, based on the valid hash key match, (i) a sequence of reference signatures corresponding to a duration of a first media asset associated with the valid hash key match with (ii) a corresponding sequence of the meter signatures in the aggregated meter data; and comparing, by executing an instruction with the processor, the sequence of reference signatures and the corresponding sequence of the meter signatures to identify media represented by at least a portion of the sequence of the meter signatures.

16. The method of claim 15, further including outputting (i) an identifier of the media represented by the at least the portion of the sequence of the meter signatures, and (ii) a third duration corresponding to a duration represented by the at least the portion of the sequence of the meter signatures, the identifier and the third duration to be output to an application that is to perform an operation based on the identifier and the third duration.

17. The method of claim 15, wherein the second duration corresponds to a twenty-four period, the first duration corresponds to a fraction of the twenty-four period, and the sequence of reference signatures corresponds to an entirety of the first media asset.

18. The method of claim 15, further including generating the meter hash keys from the meter signatures in the aggregated meter data.

19. The method of claim 15, further including:

identifying, for a first one of the meter hash keys, a set of reference hash keys that match the first one of the meter hash keys;

storing ones of the set of reference hash keys in respective data structures corresponding to media assets represented by the ones of the set of reference hash keys, the media assets including the first media asset, a first one of the data structures corresponding to the first media asset, the first one of the data structures to include a sequence of reference hash keys that match a corresponding sequence of the meter hash keys; and determining that the first one of the sequence of reference hash keys included in the first one of the data structures corresponds to the valid hash key match when the sequence of reference hash keys and the corresponding sequence of the meter hash keys satisfy one or more validation criteria.

20. The method of claim 19, wherein the aligning of the sequence of reference signatures with the corresponding sequence of the meter signatures includes:

identifying a first number of signatures from (i) an initial reference signature of the sequence of reference signatures corresponding to the duration of the first media asset to (ii) a reference signature in the sequence of reference signatures that corresponds to an initial reference hash key in the sequence of reference hash keys corresponding to the valid hash key match;

identifying an initial meter signature of the sequence of the meter signatures to be a first meter signature in the aggregated meter data that precedes, by the first number of signatures, a second meter signature in the aggregated meter data that corresponds to an initial meter hash key in the sequence of the meter hash keys corresponding to the valid hash key match; and determining the sequence of the meter hash keys to begin with the initial meter signature and include a same second number of signatures as the sequence of reference signatures.

* * * * *